(12) United States Patent
Rosenbaum et al.

(10) Patent No.: US 10,991,472 B2
(45) Date of Patent: Apr. 27, 2021

(54) SINGLE-PLATE NEUTRON ABSORBING APPARATUS AND METHOD OF MANUFACTURING THE SAME

(71) Applicant: Holtec International, Inc., Marlton, NJ (US)

(72) Inventors: Evan Rosenbaum, Marlton, NJ (US); Thomas G. Haynes, III, Tampa, FL (US); Krishna P. Singh, Hobe Sound, FL (US)

(73) Assignee: HOLTEC INTERNATIONAL

( * ) Notice: Subject to any disclaimer, the term of this patent is extended or adjusted under 35 U.S.C. 154(b) by 2219 days.

(21) Appl. No.: 14/224,655

(22) Filed: Mar. 25, 2014

(65) Prior Publication Data

US 2021/0082590 A1    Mar. 18, 2021

Related U.S. Application Data

(60) Division of application No. 12/645,846, filed on Dec. 23, 2009, now Pat. No. 8,681,924, which is a continuation-in-part of application No. 12/432,509, filed on Apr. 29, 2009, now Pat. No. 8,158,962.

(60) Provisional application No. 61/173,463, filed on Apr. 28, 2009, provisional application No. 61/048,707, filed on Apr. 29, 2008.

(51) Int. Cl.
    *G21C 19/07*    (2006.01)

(52) U.S. Cl.
    CPC .................... *G21C 19/07* (2013.01)

(58) Field of Classification Search
    CPC ................... G21C 19/07; G21F 1/08
    See application file for complete search history.

(56) References Cited

U.S. PATENT DOCUMENTS

| | | |
|---|---|---|
| 2,990,360 A | 6/1961 | Porembka, Jr. |
| 3,234,104 A | 2/1966 | Gale et al. |
| 3,658,645 A | 4/1972 | Hooper |
| 3,727,060 A | 4/1973 | Blum |
| 4,039,842 A | 8/1977 | Mollon |
| 4,096,392 A | 6/1978 | Rubinstein et al. |
| 4,124,445 A | 11/1978 | Mollon |
| 4,218,622 A | 8/1980 | Forsyth et al. |
| 4,225,467 A | 9/1980 | McMurtry et al. |
| 4,287,145 A | 9/1981 | McMurtry et al. |
| 4,382,060 A | 5/1983 | Holtz et al. |
| 4,434,092 A | 2/1984 | Mary |
| 4,462,957 A | 7/1984 | Fukui et al. |
| 4,493,813 A | 1/1985 | Loriot et al. |

(Continued)

FOREIGN PATENT DOCUMENTS

| | | |
|---|---|---|
| DE | 3216855 | 11/1983 |
| EP | 0626699 | 11/1994 |

(Continued)

*Primary Examiner* — Lily C Garner

(74) *Attorney, Agent, or Firm* — The Belles Group, P.C.

(57) ABSTRACT

A neutron absorbing insert for use in a fuel rack. In one aspect, the insert includes: a plate structure having a first wall and a second wall that is non-coplanar to the first wall; the first and second walls being formed by a single panel of a metal matrix composite having neutron absorbing particulate reinforcement that is bent into the non-coplanar arrangement along a crease; and a plurality of spaced-apart holes formed into the single panel along the crease prior to bending.

10 Claims, 25 Drawing Sheets

(56) References Cited

U.S. PATENT DOCUMENTS

| | | | |
|---|---|---|---|
| 4,507,840 A | 4/1985 | Steinert et al. | |
| 4,581,201 A | 4/1986 | Haeggstroem et al. | |
| 4,610,893 A | 9/1986 | Eriksson et al. | |
| 4,626,402 A | 12/1986 | Baatz et al. | |
| 4,631,165 A | 12/1986 | Wilson et al. | |
| 4,676,948 A | 6/1987 | Cearley et al. | |
| 4,781,883 A | 11/1988 | Daugherty et al. | |
| 4,788,029 A | 11/1988 | Kerjean | |
| 4,874,574 A | 10/1989 | Igarashi et al. | |
| 4,882,123 A | 11/1989 | Cearley et al. | |
| 4,900,508 A * | 2/1990 | Anthony | 376/438 |
| 4,948,553 A * | 8/1990 | Machado | G21C 19/40 376/272 |
| 4,988,473 A | 1/1991 | Mueller et al. | |
| 5,019,327 A | 5/1991 | Fanning et al. | |
| 5,198,183 A | 3/1993 | Newman | |
| 5,232,657 A | 8/1993 | Kovacik et al. | |
| 5,245,641 A | 9/1993 | Machado et al. | |
| 5,271,054 A * | 12/1993 | Bryan | G21C 3/34 376/443 |
| 5,291,532 A | 3/1994 | Townsend et al. | |
| 5,361,281 A * | 11/1994 | Porowski | G21C 19/07 376/272 |
| 5,365,556 A | 11/1994 | Mallie | |
| 5,438,597 A | 8/1995 | Lehnert et al. | |
| 5,479,463 A | 12/1995 | Roberts | |
| 5,629,964 A * | 5/1997 | Roberts | G21C 19/40 376/327 |
| 5,700,962 A | 12/1997 | Carden | |
| 5,841,825 A | 11/1998 | Roberts | |
| 5,914,994 A | 6/1999 | Wasinger et al. | |
| 5,965,829 A | 10/1999 | Haynes et al. | |
| 6,042,779 A | 3/2000 | Oschmann et al. | |
| 6,137,854 A | 10/2000 | Ueda et al. | |
| 6,283,028 B1 | 9/2001 | Walczak | |
| 6,327,321 B1 | 12/2001 | Holman | |
| 6,442,227 B1 | 8/2002 | Iacovino, Jr. et al. | |
| 6,481,259 B1 | 11/2002 | Durney | |
| 6,647,082 B1 | 11/2003 | Yamada et al. | |
| 6,741,669 B2 * | 5/2004 | Lindquist | G21C 19/07 376/272 |
| 8,158,962 B1 | 4/2012 | Rosenbaum et al. | |
| 8,576,976 B2 * | 11/2013 | Singh | G21F 5/012 376/272 |
| 8,630,384 B2 * | 1/2014 | Carver | G21C 19/07 376/272 |
| 8,660,231 B2 * | 2/2014 | Kielbowicz | G21C 19/07 376/272 |
| 8,681,924 B2 * | 3/2014 | Rosenbaum | G21F 1/08 376/288 |
| 2003/0174801 A1 * | 9/2003 | Costas de la Pena | G21C 19/07 376/272 |
| 2004/0105519 A1 | 6/2004 | Yamada et al. | |
| 2011/0033019 A1 | 2/2011 | Rosenbaum et al. | |

FOREIGN PATENT DOCUMENTS

| | | |
|---|---|---|
| JP | 0712985 | 1/1995 |
| WO | 2008063708 | 5/2008 |

* cited by examiner

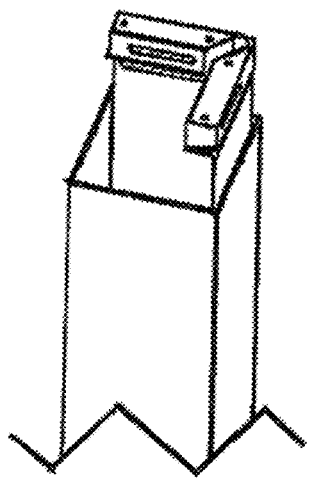
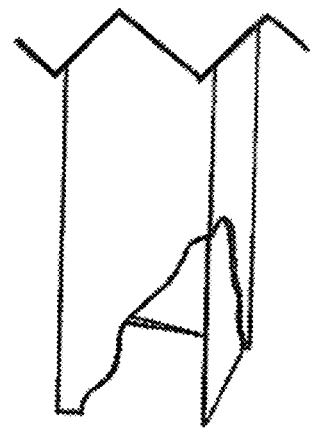
Figure 13

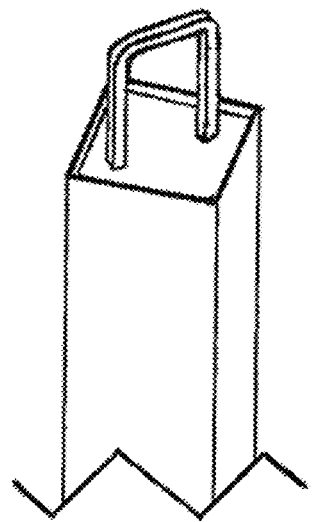
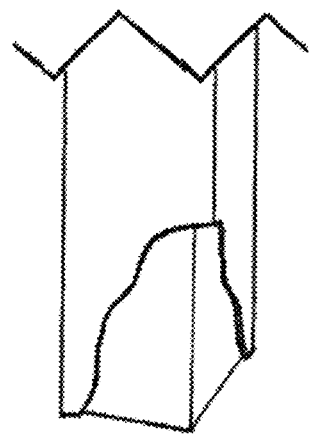
Figure 14

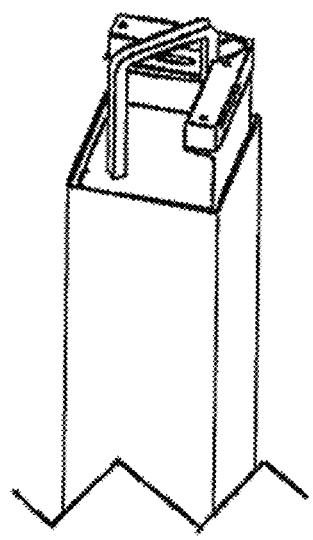
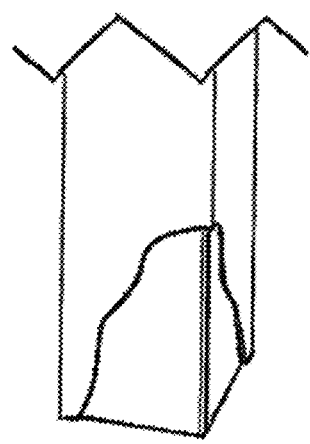
Figure 15

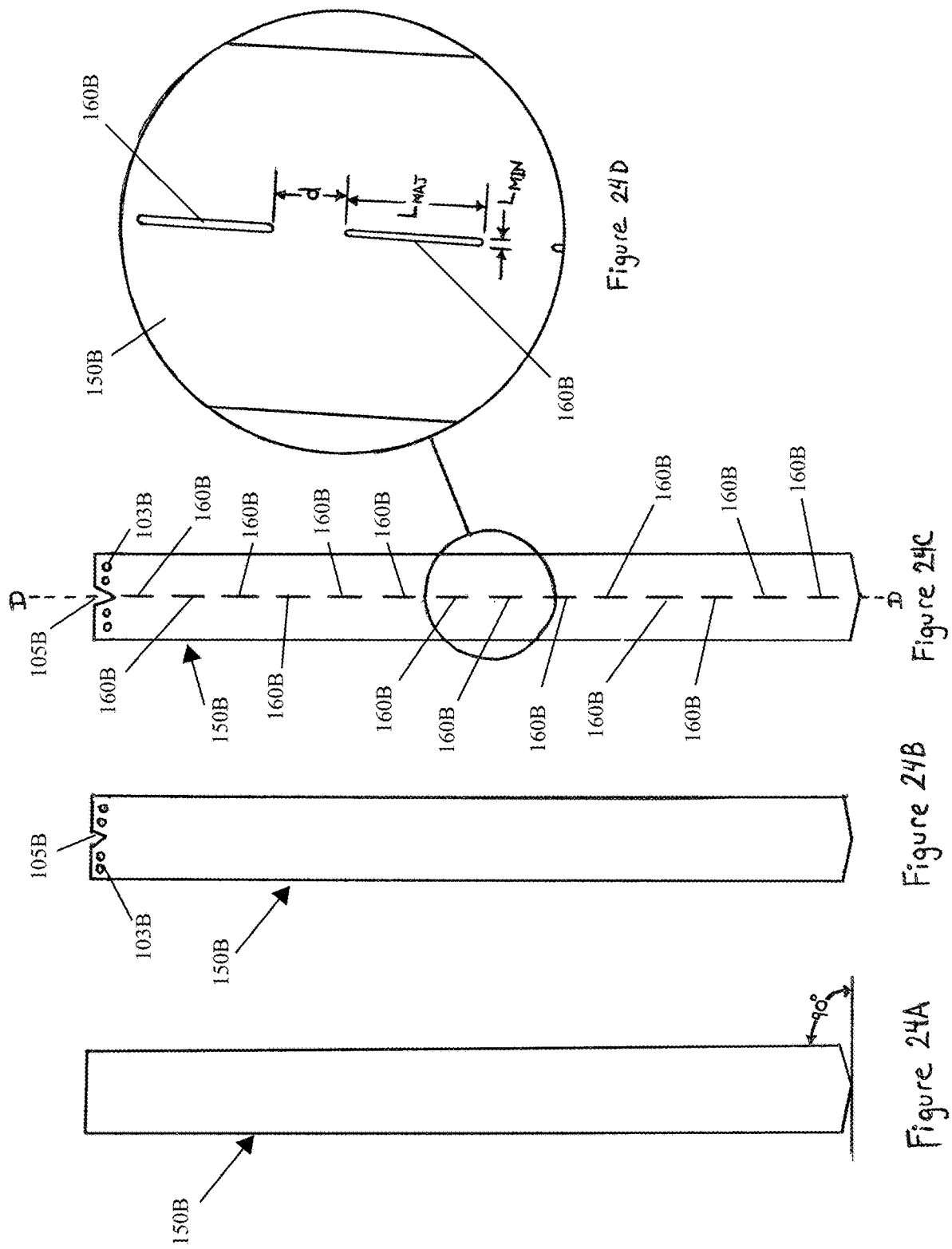

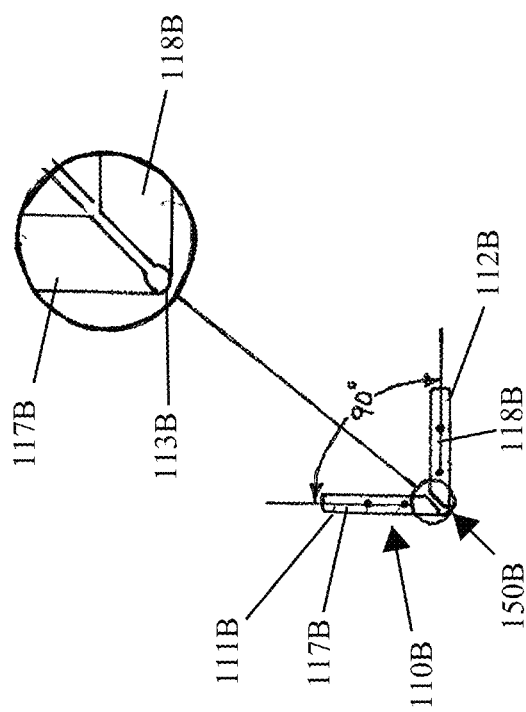
Figure 24G
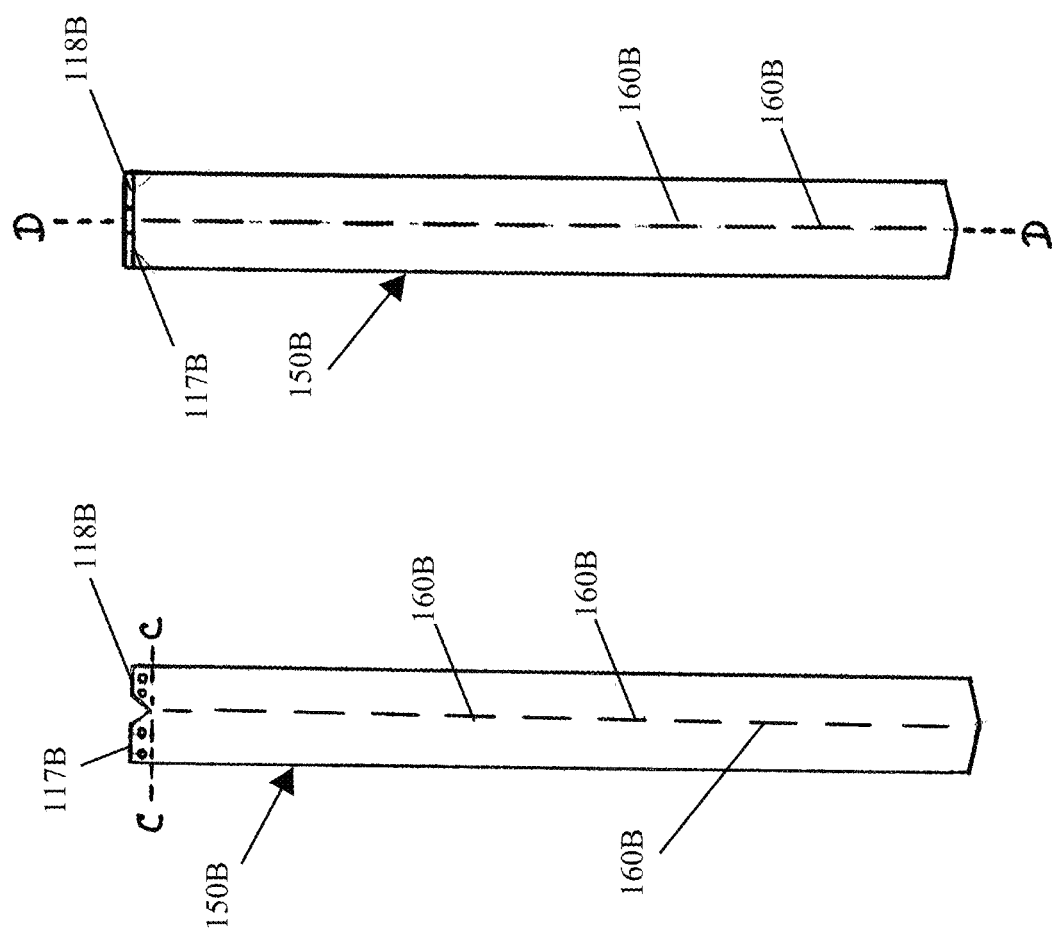
Figure 24F
Figure 24E

SINGLE-PLATE NEUTRON ABSORBING APPARATUS AND METHOD OF MANUFACTURING THE SAME

CROSS-REFERENCE TO RELATED PATENT APPLICATIONS

Priority is claimed as a divisional application to U.S. patent application Ser. No. 12/645,846, filed Dec. 23, 2009 and now U.S. Pat. No. 8,681,924, which claims priority as a continuation-in-part to U.S. patent application Ser. No. 12/432,509, filed Apr. 29, 2009 and now U.S. Pat. No. 8,158,962, which in turn claims priority to U.S. Provisional Patent Application Ser. No. 61/048,707, filed Apr. 29, 2008, and to U.S. Provisional Patent Application Ser. No. 61/173,463, filed Apr. 28, 2009. The aforementioned priority applications are incorporated herein by reference in their entireties.

FIELD OF THE INVENTION

The present invention relates generally to neutron absorbing apparatus and methods used to facilitate close packing of spent nuclear fuel assemblies, and more specifically to a single-plate neutron absorber apparatus and method of manufacturing the same. In other aspects, the invention relates to methods of supporting spent nuclear fuel assemblies in a submerged environment using the single-plate neutron absorber apparatus and a fuel rack system incorporating the single-plate neutron absorber apparatus.

BACKGROUND OF THE INVENTION

Nuclear power plants currently store their spent fuel assemblies on site for a period after being removed from the reactor core. Such storage is typically accomplished by placing the spent fuel assemblies in closely packed fuel racks located at the bottom of on site storage pools. The storage pools provide both radiation shielding and much needed cooling for the spent fuel assemblies.

Fuel racks often contain a large number of closely arranged adjacent storage cells wherein each cell is capable of accepting a spent fuel assembly. In order to avoid criticality, which can be caused by the close proximity of adjacent fuel assemblies, a neutron absorbing material is positioned within the cells so that a linear path does not exist between any two adjacent cells (and thus the fuel assemblies) without passing through the neutron absorbing material.

Early fuel racks utilized a layer of neutron absorbing material attached to the cell walls of the fuel rack. However, these neutron absorbing materials have begun to deteriorate as they have been submerged in water for over a decade. In order to either extend the period over which the fuel assemblies may be stored in these fuel racks, it is necessary to either replace the neutron absorber in the cell walls or to add an additional neutron absorber to the cell or the fuel assembly.

In an attempt to remedy the aforementioned problems with the deteriorating older fuel racks, the industry developed removable neutron absorbing inserts, such as the ones disclosed in U.S. Pat. No. 5,841,825 (the "'825 Patent"), to Roberts, issued Nov. 24, 1998; U.S. Pat. No. 6,741,669 (the "'699 Patent"), to Lindquist, issued May 25, 2004; and U.S. Pat. No. 6,442,227 (the "'227 Patent"), to Iacovino, Jr. et al., issued Aug. 27, 2002. As of recent times, the neutron absorbing insert has become the primary means by which adjacent fuel assemblies are shielded from one another when supported in a submerged fuel rack. Thus, newer fuel racks are generally devoid of the traditional layer of neutron absorbing material built into the structure of the fuel rack itself that can degrade over time. Instead, fuel assembly loading and unloading procedures utilizing neutron absorbing inserts have generally become standard in the industry.

While the neutron absorbing inserts disclosed in the '825 Patent, the '227 Patent and the '699 Patent have proved to be preferable to the old fuel racks having the neutron absorbing material integrated into the cell walls, these neutron absorbing inserts are less than optimal for a number of reasons, including without limitation complexity of construction, the presence of multiple welds, complicated securing mechanisms, and multi-layered walls that take up excessive space within the fuel rack cells. Additionally, with existing designs of neutron absorbing inserts, the inserts themselves must be removed prior to or concurrently with the fuel assemblies in order to get the fuel assemblies out of the fuel rack. This not only complicates the handling procedure but also leaves certain cells in a potentially unprotected state.

The '825 Patent discloses a neutron absorbing apparatus which includes two adjacent neutron absorbing plates and a mounting assembly with latching means configured to be secured to fuel assemblies while the fuel assemblies remain under water in a fuel storage rack. The two neutron absorbing plates of the '825 Patent are positioned orthogonally to form a chevron cross section which is placed about the fuel assemblies by insertion in the existing space between the fuel assemblies and the cell walls of a fuel storage rack. The primary embodiment of the neutron absorbing apparatus of the '825 Patent utilizes a three layer configuration consisting of a backing plate (made of aluminum or stainless steel), a neutron absorbing sheet (made of cadmium, borated stainless steel, borated aluminum, or boron in a ceramic matrix), and a cover plate (made of aluminum or stainless steel). This multi-layer embodiment is both cumbersome and difficult to manufacture. Moreover, the absence of the neutron absorbing sheet at the fold in the backing plate and at the lateral edges of the backing plate is less than optimal and provides a potential area for increased reactivity.

It should be noted that the '825 Patent also discloses a second embodiment of a neutron absorbing apparatus that allegedly eliminates any loss of nuclear absorber coverage at the fold in the backing plate and at the same time simplifies the fabrication process. In this embodiment, a special single-layer backing plate made of borated aluminum or borated stainless steel is used to replace the multi-layer arrangement of the primary embodiment. This special backing plate is itself a nuclear absorber and thus no additional absorber layer is added to provide the nuclear absorption. However, for this embodiment, the '825 Patent teaches that the special backing plate must be formed by two plates arranged to form the chevron configuration and welded together at their juncture. In this regard, the '825 Patent specifically states that for this embodiment "[t]he two individual plates are necessary because the borated backing plates cannot be folded, but must [be] welded. [T]he two borated backing plates . . . are welded together along [the] seam . . . to provide the chevron formation necessary to produce [the] plates . . . of the complete invention." For obvious reasons, welds and joints in the body of the neutron absorbing apparatus are less than optimal.

Turning to the '227 Patent, a sleeve assembly for refurbishing a fuel rack having cells in which fresh or spent nuclear fuel assemblies may be stored is disclosed. The sleeve assembly of the '227 Patent has at least one elongate wall extending from the topside of a sleeve base having an opposed bottom side. The sleeve base has a flow hole extending therethrough that communicates with one of the rack base plate flow holes. A pin assembly disposed in the sleeve base flow hole has resilient tabs extending beyond the bottom side of the sleeve base for extending into a rack base plate flow hole and resiliently engaging the rack base plate when the sleeve assembly is installed in one of the cells. The pin assembly resists horizontal and vertical movements of the sleeve assembly, permits water flow into the cell and permits sleeve assembly removal tools and inspection devices to access the pin assembly.

The '227 Patent discloses an embodiment of a sleeve assembly having chevron shaped walls formed by a single-plate. The '227 Patent discloses that these walls are an extruded composite of boron carbide and aluminum. The extruding process to form the chevron shaped walls is believed to be less than optimal as it is difficult to perform, yields unpredictable result, requires extremely tight tolerances and results in an inferior product.

Turning now to the '669 Patent, a neutron absorber system for a nuclear fuel storage rack is disclosed that includes a neutron absorber that is adapted to attach to a plurality of cell walls of a cell of the nuclear fuel storage rack. The neutron absorber is adapted to elastically deform. Means for applying at least one stress to the neutron absorber and means for releasing the at least one stress to cause the neutron absorber to attach to the plurality of cell walls of the cell of the nuclear fuel storage rack is also disclosed.

In one embodiment, the '669 Patent teaches a multi-plate longitudinal weldment to form the body of the neutron absorber system. Specifically, the '669 Patent teaches welding a metal matrix alloy corner piece to two metal matrix neutron absorber composite plates to form the chevron shape. Welds and joints in the body of the neutron absorbing apparatus are less than optimal. These welds in this embodiment render the neutron absorber system less than optimal.

The '669 Patent also teaches a neutron absorber system having chevron-shaped walls that are formed of a metal composite which includes neutron absorbing material, for example, boron carbide or a metal boron alloy, such as aluminum, magnesium, titanium, aluminum/magnesium or aluminum/titanium, in combination with boron, for example. The '629 Patent also discloses that the material may be stainless steel/boron alloys and that besides boron carbide and elemental boron, any element with a high thermal neutron absorption cross section may be substituted. The '669 Patent further states generally that the first wall and the second wall of the chevron-shaped body "may be formed of a unitary material or they may be formed separately and attached to each other, for example, via standard TIG welding or by friction stir welding." Despite this statement, the '669 Patent is devoid of any enabling teaching as to how the chevron shaped body (which consists of the two walls connected along a longitudinal edge) is formed of a unitary material of a metal composite including a neutron absorbing material. Such materials tend to be very brittle when the percentage of boron carbide becomes substantial and thus, to date, it has been generally accepted in the art that only flat plates can be satisfactorily created from such materials. The only exception being the extruding process mentioned in the '227 Patent, which as stated is less than optimal and undesirable. Therefore, the '669 Patent also fails to teach a suitable neutron absorber insert and an enabling method of manufacturing such an insert.

These and other limitations of the prior art are overcome by the present invention which is described in the following detailed specifications.

SUMMARY OF THE INVENTION

It is therefore an object of the present invention to provide a neutron absorbing apparatus and a fuel rack system incorporating the same for the submerged storage of fuel assemblies.

Another object of the present invention is to provide a neutron absorbing apparatus having a chevron-shaped wall structure formed by bending a single plate of a metal matrix composite having neutron absorbing particulate reinforcement.

Yet another object of the present invention is to provide a method of manufacturing a neutron absorbing apparatus having a chevron-shaped wall structure by bending a single plate of a metal matrix composite having neutron absorbing particulate reinforcement.

Still another object of the present invention is to provide a fuel rack system incorporating a neutron absorbing apparatus having a chevron-shaped wall structure formed by bending a single plate of a metal matrix composite having neutron absorbing particulate reinforcement.

A further object of the present invention is to provide a neutron absorbing apparatus for slidable insertion into a cell of a submerged fuel rack that eliminates the need for complicated mechanisms for securement to a fuel assembly.

A yet further object of the present invention is to provide a neutron absorbing apparatus that can be slid into and out of a loaded cell of a submerged fuel rack without requiring removal of the fuel assembly.

A still further object of the present invention is to provide a neutron absorbing apparatus having a chevron-shaped wall structure constructed of a metal matrix composite having neutron absorbing particulate reinforcement that extends the entire length of a fuel assembly.

An even further object of the present invention is to provide a neutron absorbing apparatus having a chevron-shaped wall structure constructed of a metal matrix composite having neutron absorbing particulate reinforcement that extends the entire length of a fuel assembly and is adequately rigid and straight.

Another object of the present invention is to provide a neutron absorbing apparatus that can be easily and repetitively slid into and out of a loaded cell of a submerged fuel rack.

These and other objects are met by the present invention, which in one embodiment is a neutron absorbing apparatus comprising: a sleeve having first wall and a second wall, the first and second wall forming a chevron shape; and the first and second wall being a single panel of a metal matrix composite having neutron absorbing particulate reinforcement bent into the chevron shape along a crease.

In another aspect, the invention can be a method of manufacturing a neutron absorbing apparatus comprising: a) providing a panel of a metal matrix composite having neutron absorbing particulate reinforcement; and b) bending the panel into a chevron shape having first and second walls.

In yet another aspect, the invention can be a method of manufacturing a neutron absorbing apparatus comprising: a) providing a roll of boron carbide aluminum matrix composite; b) hot rolling the roll of boron carbide aluminum matrix composite; c) straightening and flattening the roll of boron carbide aluminum matrix composite using a hot roll leveler to create a panel of boron carbide aluminum matrix composite; d) shearing the panel of boron carbide aluminum matrix composite to a desired geometry; and e) bending the panel boron carbide aluminum matrix composite into a chevron shape having first and second longitudinal walls.

In still another aspect, the invention can be a method of creating a useful article having neutron absorbing properties comprising: a) providing a panel of a metal matrix composite having neutron absorbing particulate reinforcement; and b) bending the panel to form a chevron shape having first and second walls.

In a further aspect, the invention can be a system for supporting radioactive fuel assemblies in a submerged environment comprising: a fuel rack comprising a base plate and an array of cells; and a neutron absorbing insert slidably inserted into one or more of the cells, the neutron absorbing insert comprising a sleeve having first wall and a second wall, the first and second wall forming a chevron shape, and the first and second wall being a single panel of a metal matrix composite having neutron absorbing particulate reinforcement bent into the chevron shape.

In another aspect, the invention is a neutron absorbing apparatus comprising: a plate structure having a first wall and a second wall that is non-coplanar to the first wall; the first and second walls being formed by a single panel of a metal matrix composite having neutron absorbing particulate reinforcement that is bent into the non-coplanar arrangement along a crease; and a plurality of spaced-apart holes formed into the single panel along the crease.

In yet another aspect, the invention can be a system for supporting spent nuclear fuel in a submerged environment comprising: a fuel rack comprising an array of cells; a fuel assembly positioned within at least one of the cells of the fuel rack; at least one neutron absorbing insert comprising a single panel of a metal matrix composite having neutron absorbing particulate reinforcement that is bent into a chevron shape along a crease, and a plurality of spaced-apart holes formed into the single panel along the crease; and the neutron absorbing insert positioned within the cell of the fuel rack so that the sleeve is located between the fuel assembly and the walls of the fuel rack.

In a still further embodiment, the invention can be a method of manufacturing a neutron absorbing apparatus comprising: a) providing a single panel of a metal matrix composite having neutron absorbing particulate reinforcement; b) forming a line of spaced-apart holes in the single panel; and c) bending the panel along the line into a chevron shape having first and second walls.

In still another embodiment, the invention can be a method of manufacturing a neutron absorbing apparatus comprising: a) providing a roll of boron carbide aluminum matrix composite; b) hot rolling the roll of boron carbide aluminum matrix composite; c) straightening and flattening the roll of boron carbide aluminum matrix composite using a hot roll leveler to create a panel of boron carbide aluminum matrix composite; d) shearing the panel of boron carbide aluminum matrix composite to a desired geometry; e) forming a line of spaced-apart slits in the single panel; and f) bending the panel boron carbide aluminum matrix composite along the line into a chevron shape having first and second longitudinal walls.

BRIEF DESCRIPTION OF THE DRAWINGS

FIG. 13 is a perspective view of the neutron absorbing insert of FIG. 8 slidably inserted into an empty cell of a submerged fuel rack according to an embodiment of the present invention.

FIG. 14 is a perspective view of a fuel assembly in a submerged fuel rack.

FIG. 15 is a perspective view of submerged fuel rack having a fuel assembly loaded into one of the cells and the neutron absorbing insert of FIG. 8 slidably inserted into the cell about the fuel assembly.

FIG. 24A is front view of a flat sheet of metal matrix composite having neutron absorbing particulate reinforcement that has been cut to the desired size and geometry so that it can be bent to form a chevron-shaped sleeve portion of a neutron absorbing insert according to one embodiment of the present invention.

FIG. 24B is a front view of the flat sheet of FIG. 24A with a V-shaped notch and dowel holes punched therein.

FIG. 24C is a front view of the flat sheet of FIG. 24B wherein a line of spaced-apart slits have been formed therein.

FIG. 24D is a close-up of area X-X of FIG. 24C.

FIG. 24E is a front view of the flat sheet of FIG. 24C wherein the top ends of the flat sheet have been bent downward along line C-C of FIG. 24B to forn first and second flanges.

FIG. 24F is a front view of the flat sheet of FIG. 24C wherein the flat sheet has been bent longitudinally along the line of spaced-apart slits to form the chevron-shaped sleeve portion.

FIG. 24G is a top view of the flat sheet of FIG. 24C wherein the flat sheet has been bent longitudinally along the line of spaced-apart slits to form the chevron-shaped sleeve portion.

DETAILED DESCRIPTION OF THE DRAWINGS

Neutron Absorbing Insert: First Exemplified Embodiment

Figure 1:
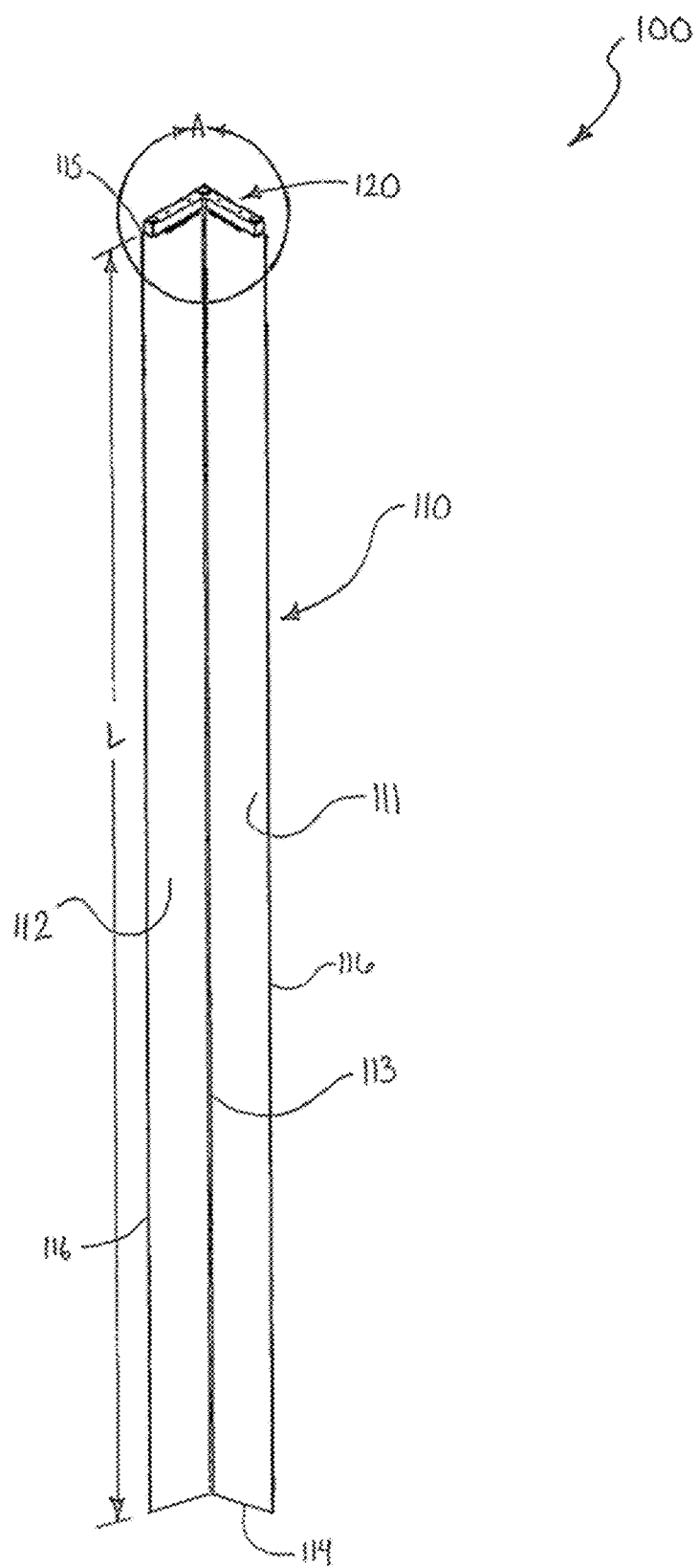
FIG. 1 is a top perspective view of a neutron absorbing insert according to one embodiment of the present invention.
Figure 2:
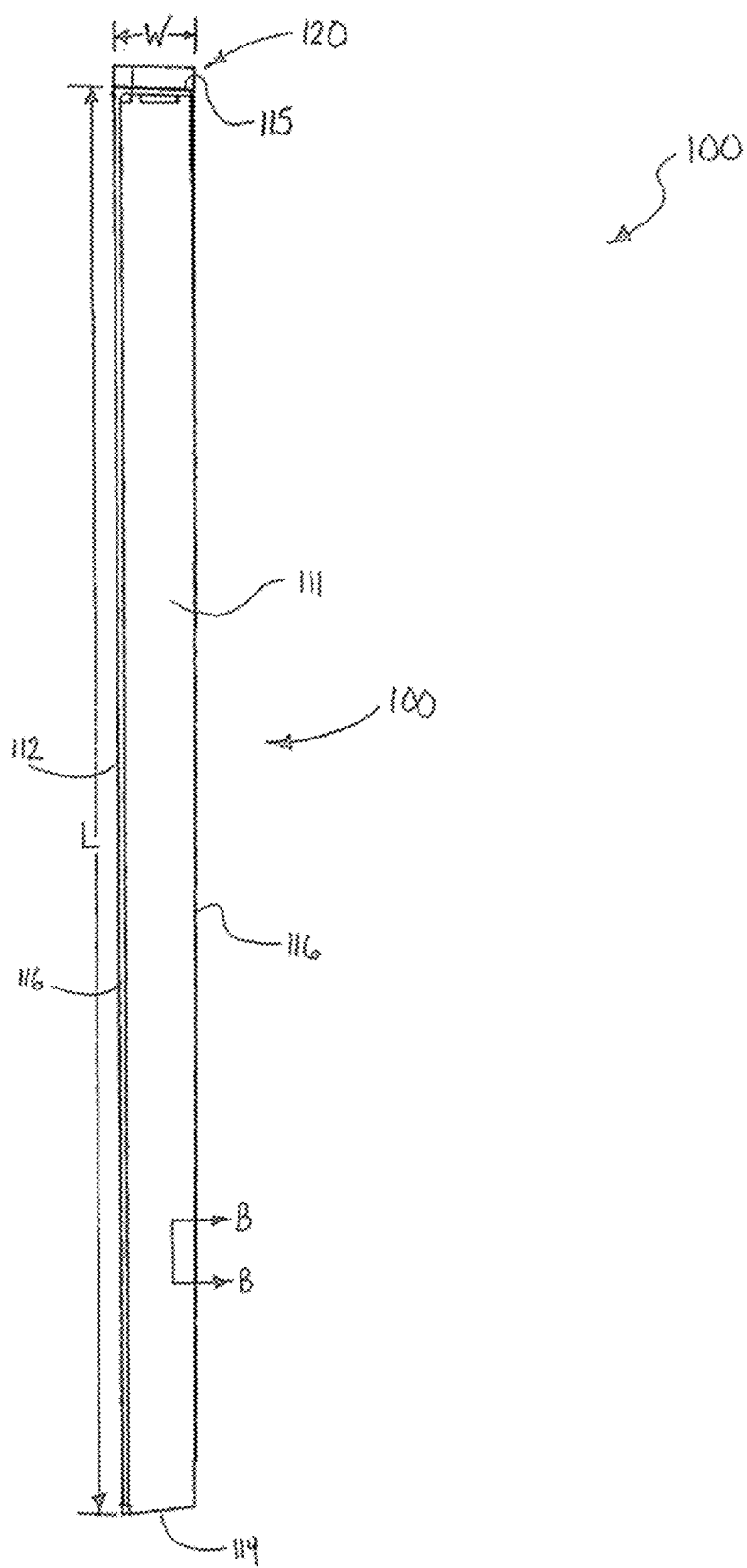
FIG. 2 is side view of the neutron absorbing insert of FIG. 1.
Figure 3:
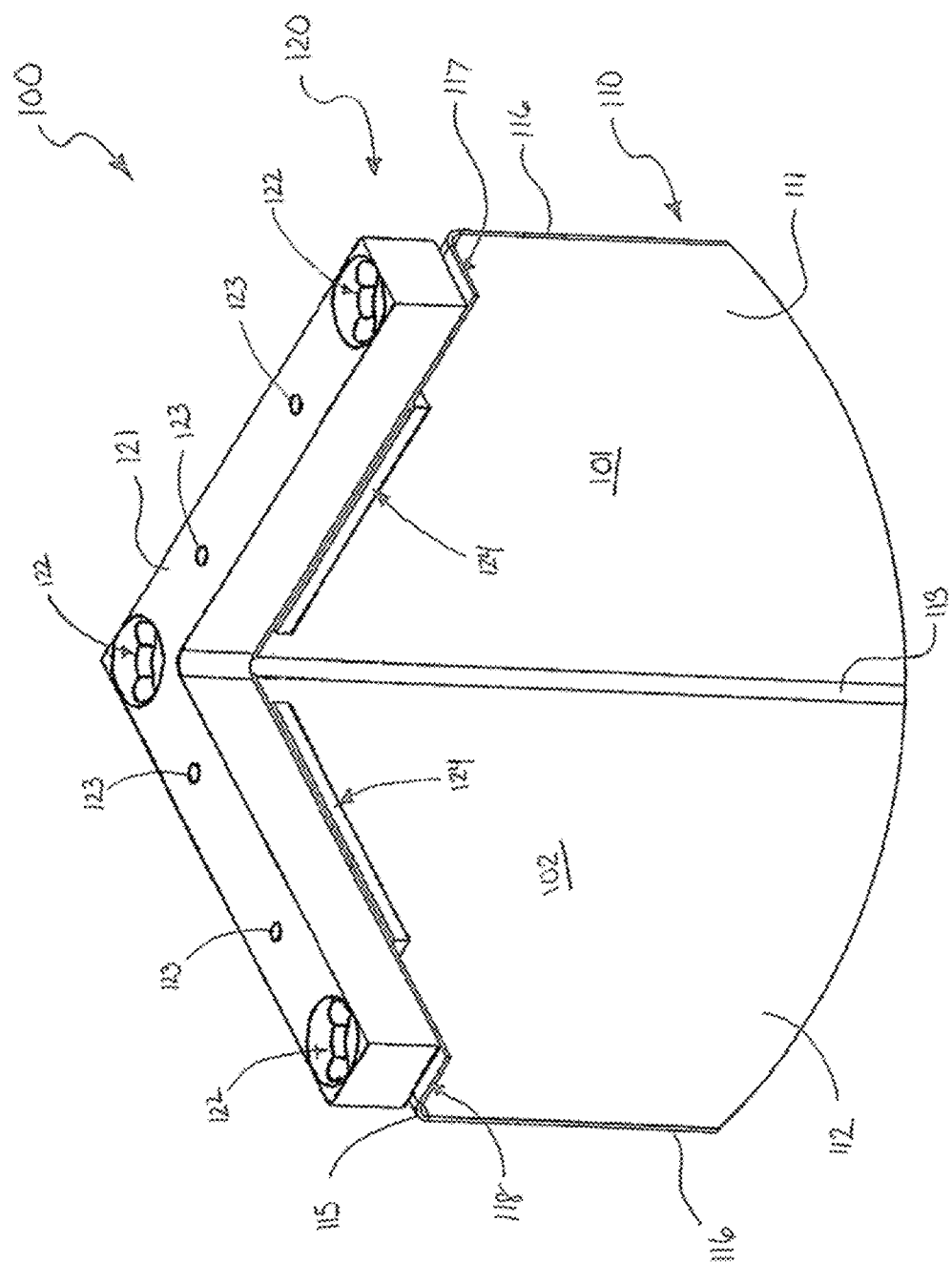
FIG. 3 is a close-up view of area A of FIG. 1 showing the detail of the top end reinforcement assembly of the neutron absorbing insert according to one embodiment of the present invention.

Referring first to FIGS. 1 and 2 concurrently, a neutron absorbing insert 100 according to one embodiment of the present invention is illustrated. The neutron absorbing insert 100 and the inventive concepts explained herein can be used in conjunction with both PWR or BWR storage requirements. The neutron absorbing insert 100 is specifically designed to be slidably inserted at strategic locations within the cell array of a submerged fuel rack. However, in some embodiments, it is to be understood that the inventive neutron absorbing insert can be used in any environment (and in conjunction with any other equipment) where neutron absorption is desirable. Furthermore, in embodiments where the invention is based solely on the method of bending a metal matrix composite having neutron absorbing particulate reinforcement (or the resulting angled plate structure), the invention can be used in any environment and/or used to create a wide variety of structures, including without limitation fuel baskets, fuel racks, sleeves, fuels tubes, housing structures, etc.

The neutron absorbing insert 100 generally comprises a reinforcement assembly 120 fastened to the top end of the sleeve 110. The sleeve 110 is chevron-shaped and constructed of a boron carbide aluminum matrix composite material. However, other metal matrix composites having neutron absorbing particulate reinforcement can be used. Examples of such materials include without limitation stainless steel boron carbide metal matrix composite. Of course, other metals, neutron absorbing particulate and combinations thereof can be used including without limitation titanium (metal) and carborundum (neutron absorbing particulate). Suitable aluminum boron carbide metal matrix composites are sold under the name Metamic® and Boralyn®.

The boron carbide aluminum matrix composite material of which the sleeve 110 is constructed comprises a sufficient amount of boron carbide so that the sleeve 110 can effectively absorb neutron radiation emitted from a spent fuel assembly and thereby shield adjacent spent fuel assemblies in a fuel rack from one another. In one embodiment, the sleeve 110 is constructed of an aluminum boron carbide metal matrix composite material that is 20% to 40% by volume boron carbide. Of course, the invention is not so limited and other percentages may be used. The exact percentage of neutron absorbing particulate reinforcement required to be in the metal matrix composite material will depend on a number of factors, including the thickness (i.e., gauge) of the sleeve 110, the spacing between adjacent cells within the fuel rack, and the radiation levels of the spent fuel assemblies.

However, as space concerns within the fuel pond increase, it has become desirable that the sleeve 110 take up as little room as possible in the cell of the fuel rack. Thus, the sleeve 110 is preferably constructed of an aluminum boron carbide metal matrix composite material having a percentage of boron carbide greater than 25%. While the addition of boron carbide particles to the aluminum matrix alloy increases the ultimate tensile strength, increases yield strength, and dramatically improves the modulus of elasticity (stiffness) of the material, it also results in a decrease in the ductility and fracture toughness of the material compared to monolithic aluminum alloys. Prior to the current inventive manufacturing process, these properties have limited the ways in which metal matrix composites having neutron absorbing particulate reinforcement could be used, thereby leading to difficulty in fabrication of the material into usable products.

Figure 9:
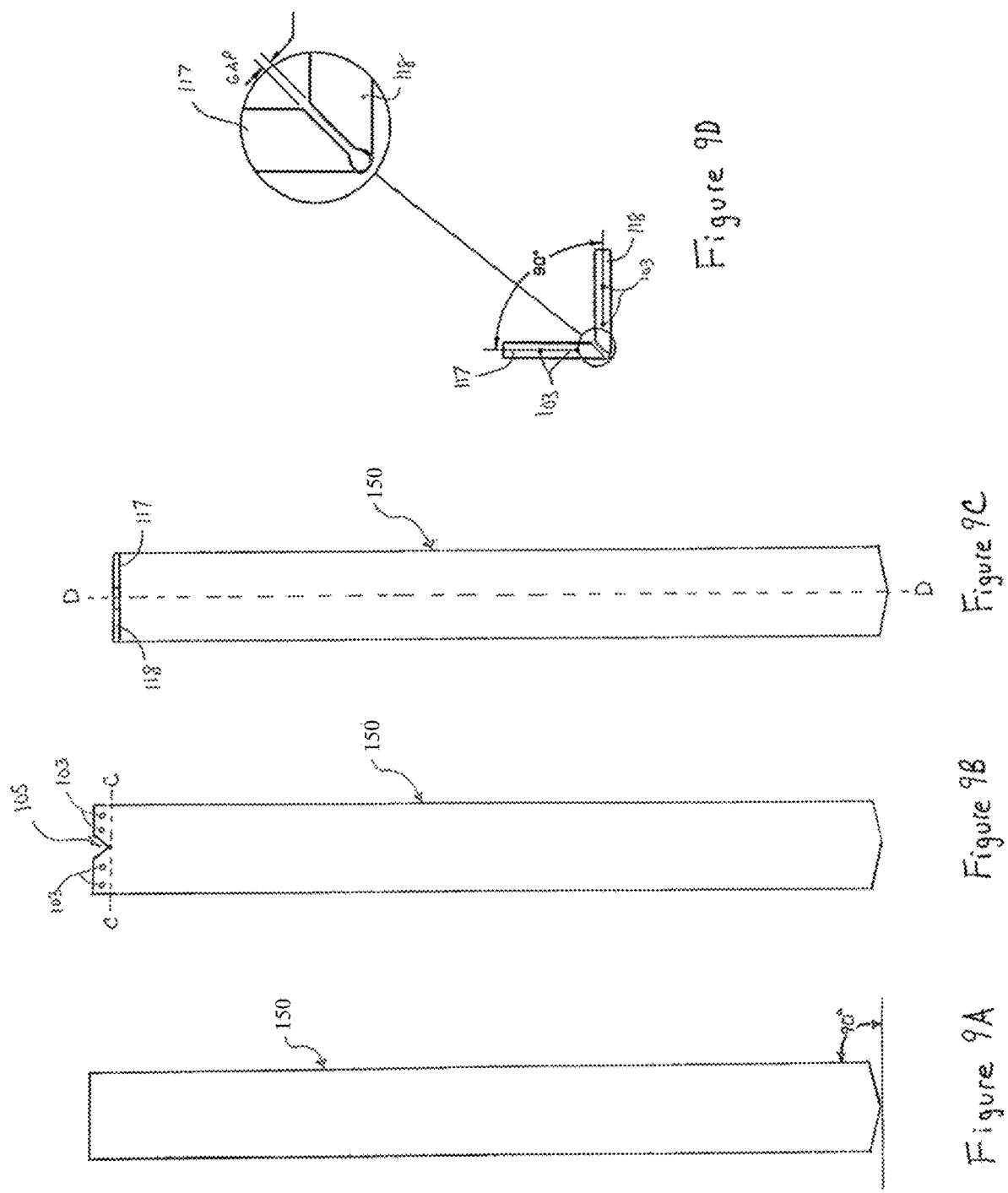
FIG. 9A is front view of a flat sheet of metal matrix composite having neutron absorbing particulate reinforcement that has been cut to the desired size and geometry so that it can be bent to form the chevron-shaped sleeve portion of the neutron absorbing insert of FIG. 1 according to one embodiment of the present invention.
FIG. 9B is a front view of the flat sheet of FIG. 9A with a V-shaped notch and dowel holes punched therein.
FIG. 9C is a front view of the flat sheet of FIG. 9B wherein the top ends of the flat sheet have been bent downward along line C-C of FIG. 98 to form first and second flanges.
FIG. 9D is a top view of the flat sheet of FIG. 9C wherein the flat sheet has been bent longitudinally along line D-D of FIG. 9C to form the chevron-shaped sleeve portion.

However, as will be described in greater detail below, the current invention has made it possible to bend sheets of boron carbide aluminum matrix composite material (and other metal matrix composites having neutron absorbing particulate reinforcement). Thus, the walls 111, 112 of the sleeve 110 are formed into the chevron shape by bending a single sheet of boron carbide aluminum matrix composite material in an approximate 90 degree angle along its length. Of course, other angles can be achieved. This inventive process will be described in greater detail below with respect to FIGS. 9-11.

Referring still to FIGS. 1 and 2, the sleeve 110 has a first longitudinal wall 111 and a second longitudinal wall 112. The first longitudinal wall 111 is integral with and joined to the longitudinal second wall 112 along crease 113. The first longitudinal wall 11 and the second longitudinal wall 112 form a chevron shaped structure (viewed from the top or bottom). The chevron shape formed by the first longitudinal wall 111 and the second longitudinal wall 112 has an approximately 90 degree angle. Of course, other angles are contemplated, both acute and obtuse.

Figure 7:
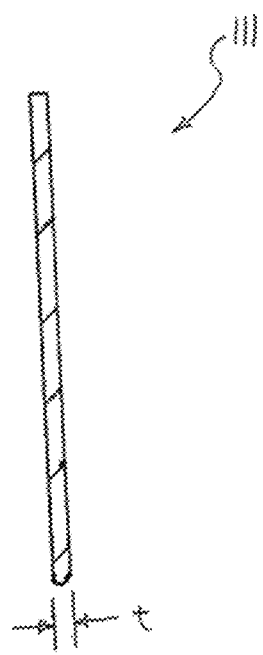
FIG. 7 is a cross-sectional view of the wall plate of the neutron absorbing insert along view B-B of FIG. 2.

The first longitudinal wall 111 is integral with the second longitudinal wall 112 because the sleeve 110 is formed by bending a single sheet of boron carbide aluminum matrix composite along the crease 113 to form the chevron shape with the desired angle. The single sheet of boron carbide aluminum matrix composite (and thus the sleeve 110) preferably has a gauge thickness t (FIG. 7) between 0.065 to 0.120 inches, and most preferably about 0.050 inches. The crease 113 is preferably formed with an apex radii between 0.375 to 0.625 inches. Of course, the invention is not limited to any specific apex radii or gauge thickness unless specifically recited in the claims. However, these dimensions will affect process optimization parameters during the boron carbide aluminum matrix composite sheet bending procedure and should be considered, specifically the bending rate and required temperatures of the work piece and tools.

The sleeve 110 has a length L that extends from its bottom edge 114 to its top edge 115. The bottom edge 114 has a skewed shape to facilitate ease of insertion of the neutron absorbing insert 100 into a cell of a fuel rack. Specifically, the bottom edge 114 of each of the first and second longitudinal walls 111, 112 taper upward and away from the crease 113.

The length L of the neutron absorbing insert 100 is preferably chosen so that the sleeve 100 extends at least the entire height of the fuel assembly with which it is to be used in conjunction. More preferably, the length L is preferably chosen so that the bottom edge 114 of the sleeve 110 can contact and rest atop a base plate of a fuel rack when inserted into a cell of the fuel rack without the reinforcement assembly 120 contacting the fuel assembly loaded in that cell. In one embodiment, the length L of the sleeve 110 will be in a range between 130 and 172 inches, and more preferably between 145 and 155 inches.

Of course, the invention is not so limited and any length L may be used. In some embodiments, the length L of the sleeve 110 will only extend a fraction of the fuel assembly's height. In many instances this will be sufficient to shield adjacent fuel assemblies from one another because the irradiated uranium rods do not extend the entirety of the fuel assembly's height as the fuel assembly's lid and its base structure add to its height.

Each of the first and second longitudinal walls 111, 112 have a width W that extends from the crease 113 to their outer lateral edges 116. The width W is preferably in the range between 4.25 to 8.90 inches, and most preferably about 5.625 inches. Of course, the invention is not limited to any particular width W. Further, in some embodiments the width of the first and second longitudinal walls 111, 112 may be different from one another if desired. Of course, the most preferred width W of the first and second longitudinal walls 111, 112 will be decided on a case-by-case basis and will be primarily dictated by the width of the fuel assembly housing and/or the size of the cell of the fuel rack with which the neutron absorbing insert 100 will be used in conjunction.

Furthermore, while the sleeve 110 is illustrated as a two-walled chevron shape embodiment, it is to be understood that the in some embodiments the sleeve 110 may have more than two longitudinal walls. For example, in an alternative embodiment, the sleeve 110 can be formed to have three longitudinal walls formed into a general U-shape. In such an embodiment, it is preferred that the longitudinal juncture between at least two of the longitudinal walls be formed by bending. However, all longitudinal junctures may be formed by bending if desired. The number of longitudinal walls will be dictated by the arrangement and shape of the cells in the fuel rack or apparatus in which the neutron absorbing insert 100 is to be used.

Figure 4:
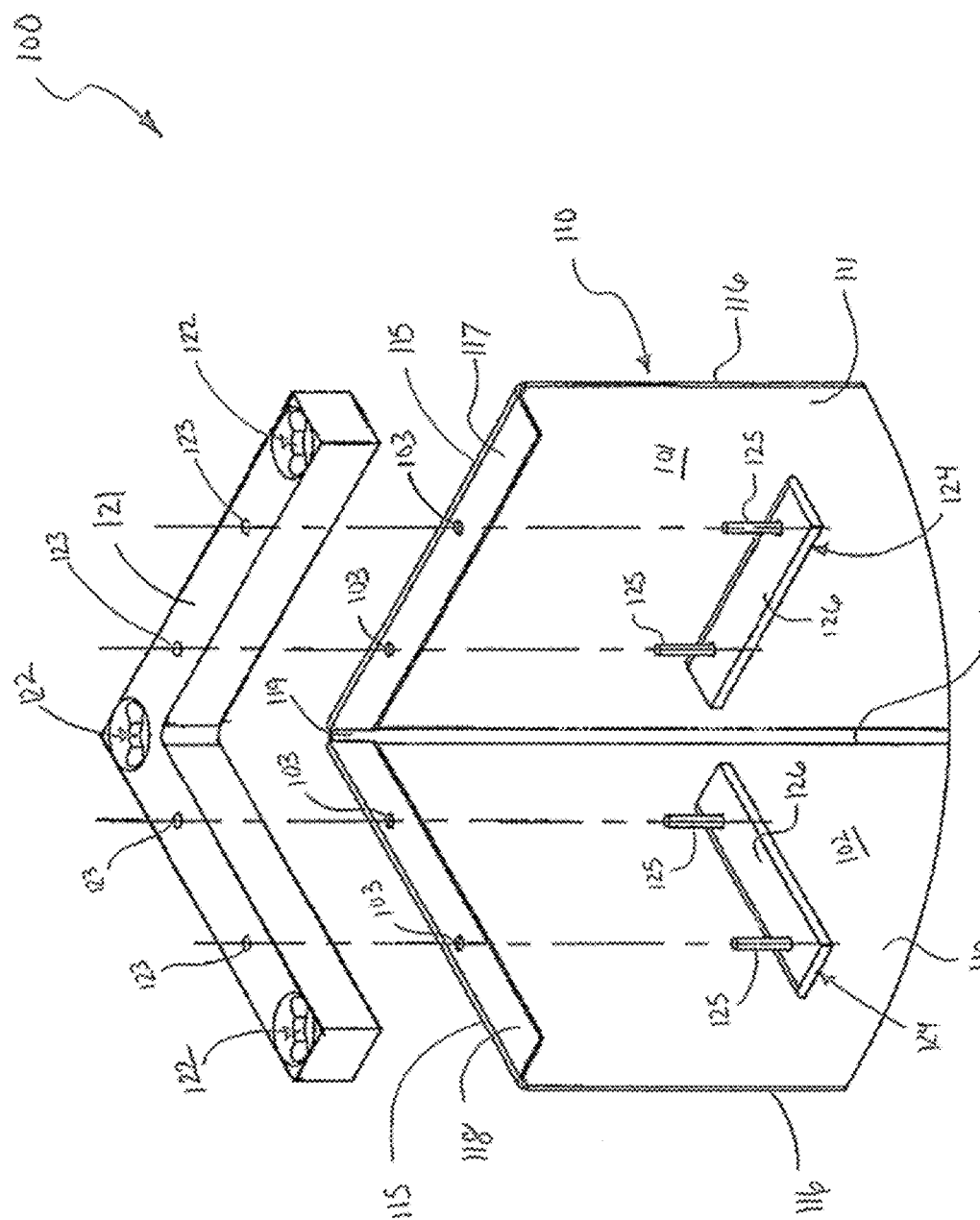
FIG. 4 is an exploded view of FIG. 3 showing the components of the top end reinforcement assembly.
Figure 5:
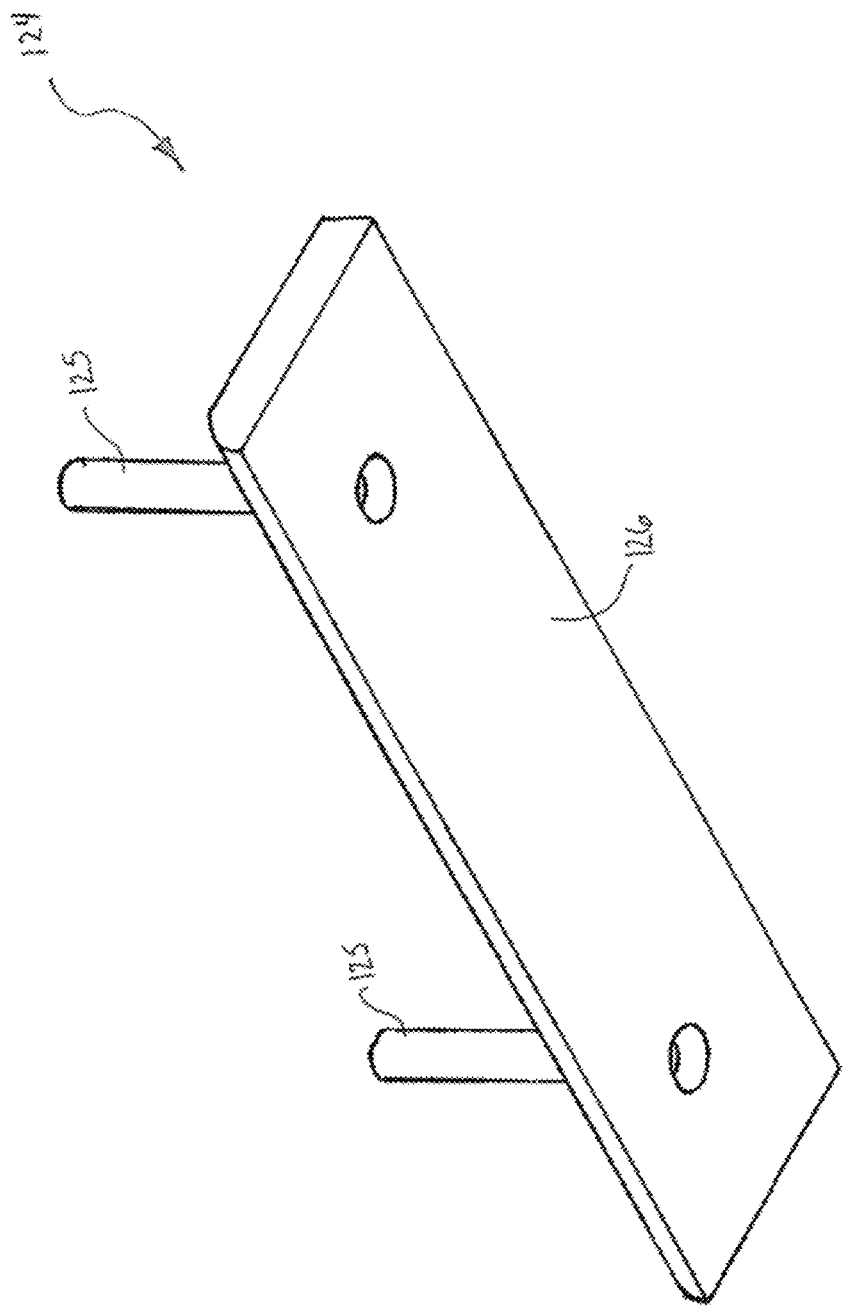
FIG. 5 is a bottom perspective view of the dowel member of the top end reinforcement assembly
Figure 6A:
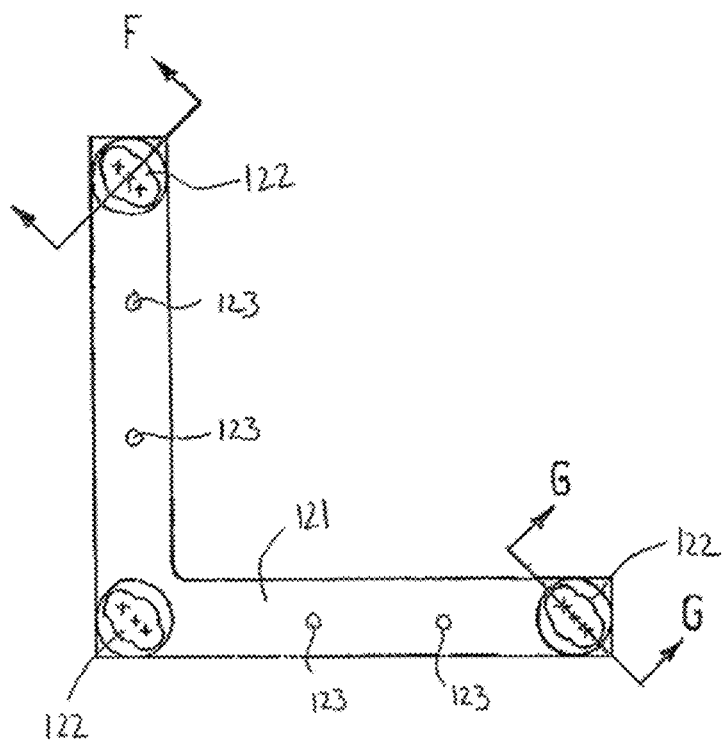
FIG. 6A is a top view of the block of the top end reinforcement assembly.
Figure 6B:
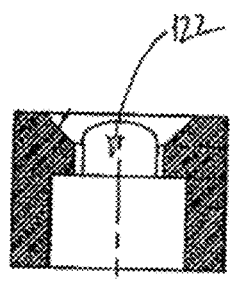
FIG. 6B is a cross-sectional view of the block of the top end reinforcement assembly along view F-F showing the detail of the hole for engaging a lifting tool.
Figure 6C:
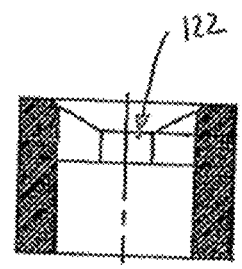
FIG. 6C is a cross-sectional view of the block of the top end reinforcement assembly along view G-G.

Referring now to FIGS. 3-6C concurrently, the structural and component details of the top end of the neutron absorbing insert 100 and the reinforcement assembly 120 will be described. The top end of the sleeve 110 comprises first and second flanges 117, 118 bent inwardly toward a central axis. The comprises first and second flanges 117, 118 are bent into the top end of each of the first and second longitudinal walls 111, 112 respectively. The flanges 117, 118 extend from the inner major surfaces 101, 102 of the first and second longitudinal walls 111, 112 at an approximately 90 degree angle. The flanges 117, 118 are arranged in an approximately orthogonal relationship to one another and are separated by a gap 119 (FIG. 4).

The flanges 117, 118 provide structural rigidity to the first and second longitudinal walls 111, 112 and also provide a connection area for the L-shaped reinforcement block 121. While the flanges 117, 118 are formed by bending the sheet of boron carbide aluminum matrix composite material, in other embodiments, the flanges can be connected as separate components (such as blocks) or omitted all together.

Each of the flanges 117, 118 comprise a plurality of holes 103 extending through the flanges 117, 118. The holes 103 are sized and shaped so that the dowels 125 of the dowel bar 124 can slidably pass therethrough.

The reinforcement assembly 120 generally comprises a reinforcement block 121 and a dowel bar 124. The reinforcement block 121 is an L-shaped solid block of aluminum. Of course, other shapes and materials can be utilized. Moreover, the reinforcement block 121 can be a plurality of blocks working together. The reinforcement block 121 serves two primary functions: (1) to provide structural rigidity and integrity to the neutron absorbing insert 100 (and the sleeve 110); and (2) to provide an adequately strong structure by which a handling mechanism can engage, lift, lower, rotate and translate the neutron absorbing insert 100.

The reinforcement block 121 comprises a plurality of engagement holes 122 that provide a geometry to which a lifting tool can engage for movement of the neutron absorbing insert 100. Of course, other mechanism can be used for the interlock mechanism, such as eye books, tabs, etc. Dowel holes 123 are also provides through the reinforcement block 121. The dowel holes 123 are sized and shaped to slidably accommodate the dowel pins 125 of the dowel bar 124 in a tight fit manner.

The dowel bar 124 comprises a body 126 having a top surface and a bottom surface. A plurality of dowel pins 125 protrude form the top surface of the body 126. The dowel bar 124 is preferably aluminum. When assembled, the dowel bars 124 are positioned below the flanges 117, 118 while the reinforcement bar 121 is positioned above the flanges 117, 118. The components 121, 124, 110 are properly aligned so that the dowel pins 125 are slidably inserted through the flange holes 103 and into the holes 123 on the reinforcement bar 121, thereby sandwiching the flanges 117, 118 therebetween. The dowels 125 are secured within the holes 123 of the reinforcement block 121 by any desired means, such as a tight-fit-assembly, welding, adhesion, threaded interlock, a bolt, etc.

Figure 8:
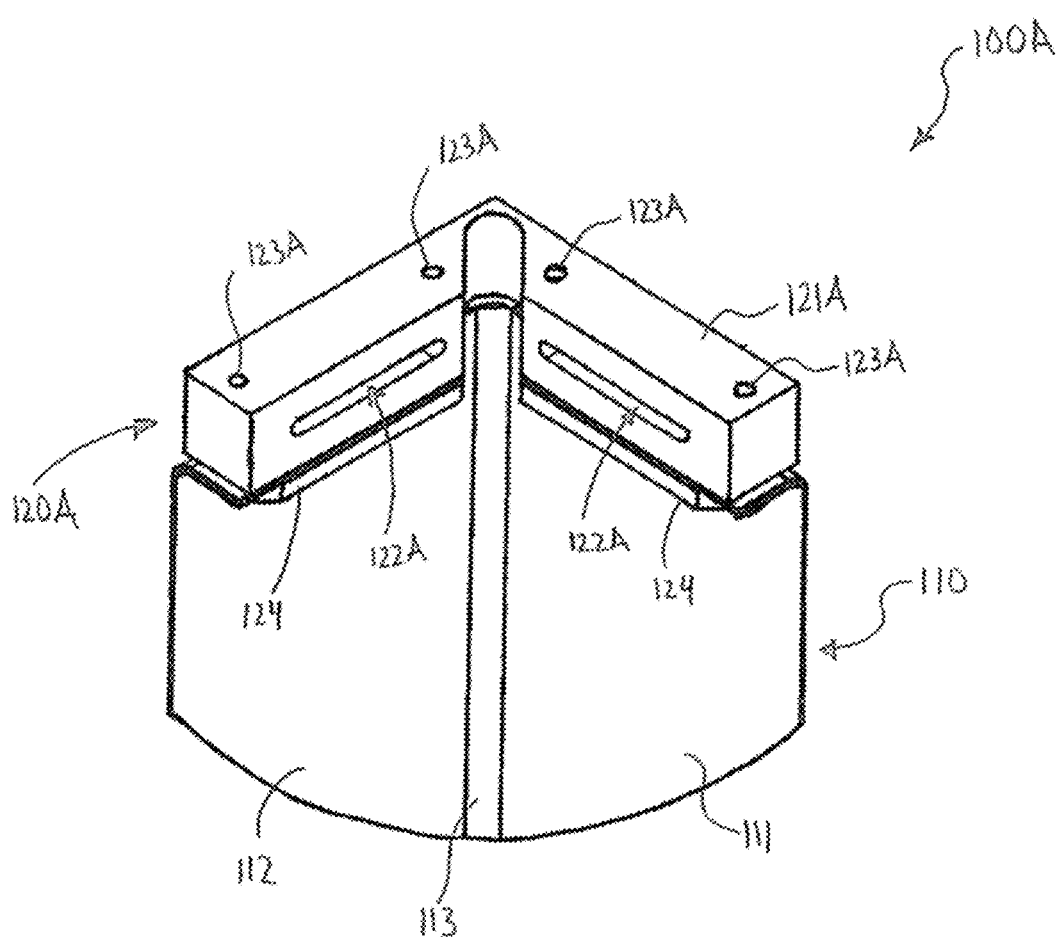
FIG. 8 is a close-up view of the top end reinforcement assembly of a neutron absorbing insert according to second embodiment of the present invention.

FIG. 8 is an alternative embodiment of a neutron absorbing insert 100A. The neutron absorbing insert 100A is identical to the neutron absorbing insert 100 described above with the exception that a different reinforcement mechanism 120A is utilized. As can be seen, the major difference is that the interlock holes 122A are slots extending laterally through the block body 121. The different design is utilized to accommodate a different handling tool.

Manufacturing Process for Bending a Metal Matrix Composite Having Neutron Absorbing Particulate Reinforcement As mentioned above, the sleeve 110 of the neutron absorbing insert 100 is formed by bending a single sheet of boron carbide aluminum matrix composite material. Since the boron carbide aluminum metal matrix composite material (and other metal matrix composite having neutron absorbing particulate reinforcement) exhibit the high stiffness and low ductility mechanical properties—they are very difficult and/or impossible to fabricate using conventional metal work equipment and metallurgical practices. This difficulty in fabrication becomes even more difficult as the particulate reinforcement level approaches 25% volume loading or greater of ceramic particulate. At high ceramic particulate volume loadings the elongation drops by a factor of 3 to 4 compared to the monolithic conventional aluminum alloys. To further increase the difficulty of fabricating the metal matrix composite material addition of the ceramic particulate dramatically increase the flow stress by up to 25% as the reinforcement loading level increases in the aluminum matrix.

In order to make possible the useful bending of silicon carbide aluminum matrix composite material, a novel and nonobvious manufacturing process has been developed, referred to herein as "hot fabrication process technology." This process will be described in detail below. It has been through the development of this hot fabrication process technology that the formation of useful products through bending of boron carbide aluminum matrix composite material has become possible. Of course, the fundamentals of this process can be easily applied to other metal matrix composite materials having neutron absorbing particulate reinforcement, with minor process parameter optimization.

In order to successfully bend an aluminum boron carbide metal matrix composite material into a "chevron" profile one must modify all equipment and process parameters compared to conventional aluminum alloys in a number of ways.

In order to produce suitable panels (i.e., sheets) of aluminum boron carbide metal matrix composite material, the quality of the work rolls used in the rolling process are first improved to overcome the abrasive nature and the propensity of the rolls to dimple during the sheet fabrication process. This is done through a hot rolling step. The hot rolling is performed while maintaining the material rolling temperature between 890 to 1010° F. Because the panels are so thin, the rollers (and other tools) are also heated to temperatures corresponding to the temperature of the panel at that step so as to eliminate rapid heat loss from the panel when contact is made with the rollers (or other interfaces).

Once hot rolled, the rough panels are thermally straightened and flattened. In order to straighten and flatten the panel to meet the necessary specifications—a modified roll leveler is used. The roll leveler is modified to allow for "hot" roll leveling between a 750-1000° F. operating temperature. The roll leveler is designed to accommodate high temperature leveling without seizing up.

The rough hot panel is then sheared to the desired final length and width. At this time, the necessary skew is sheared into the bottom edge of the panel, resulting in the single panel 150 shown at FIG. 9A.

Subsequently, a V-shaped notch 105 is cutout of the top edge of the panel 150 and the dowel holes 103 are punched therein (FIG. 9B). The flanges 117, 118 are then bent into the panel 150 by bending the panel 150 along line C-C (FIG. 9B).

Figure 10:
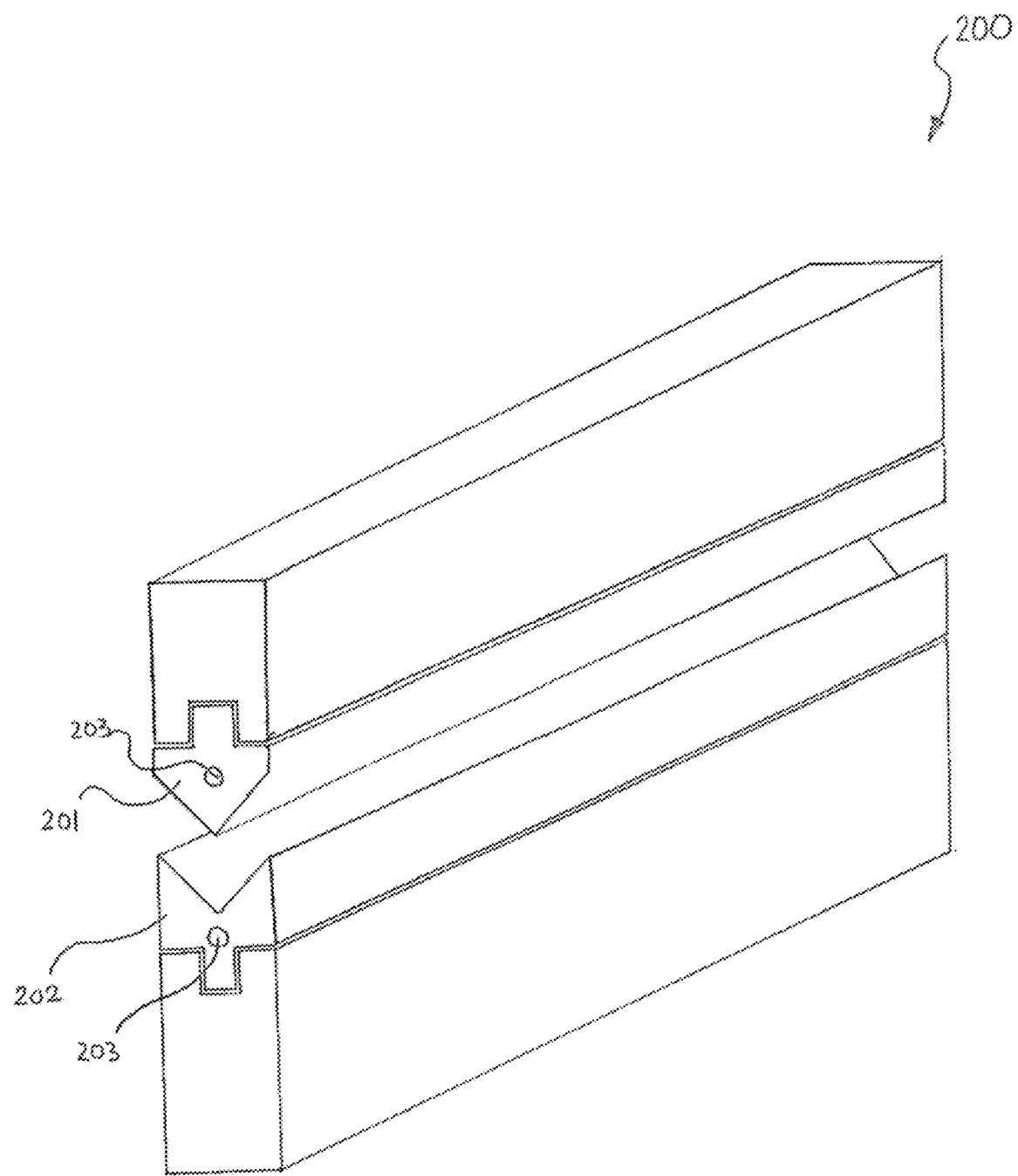
FIG. 10 is a schematic representation of a hot press used to bend the flat sheet along line D-D of FIG. 9C to form the chevron-shaped sleeve portion according to one embodiment of the present invention.

The panel 150 is then bent into the chevron shape along line D-D (FIG. 9C) using the hot brake press 200 illustrated in FIG. 10. In order to bend the panel 150 into the chevron profile, the brake punch 201 and die 202 of the brake press 200 are heated to a temperature above 500 degrees Fahrenheit, and preferably between 500 and 1000 degrees Fahrenheit, using immersion heaters 203. The tip of the brake punch 201 has a ⅛ inch radius while the corresponding valley of the die 202 terminates at an apex having a radius of 3/16 inch. The panel 150 is also heated to a temperature above 750° F., preferably between 890-1010° F., before bending the panel 150 into chevron profile illustrated in FIG. 9D.

Figure 11:
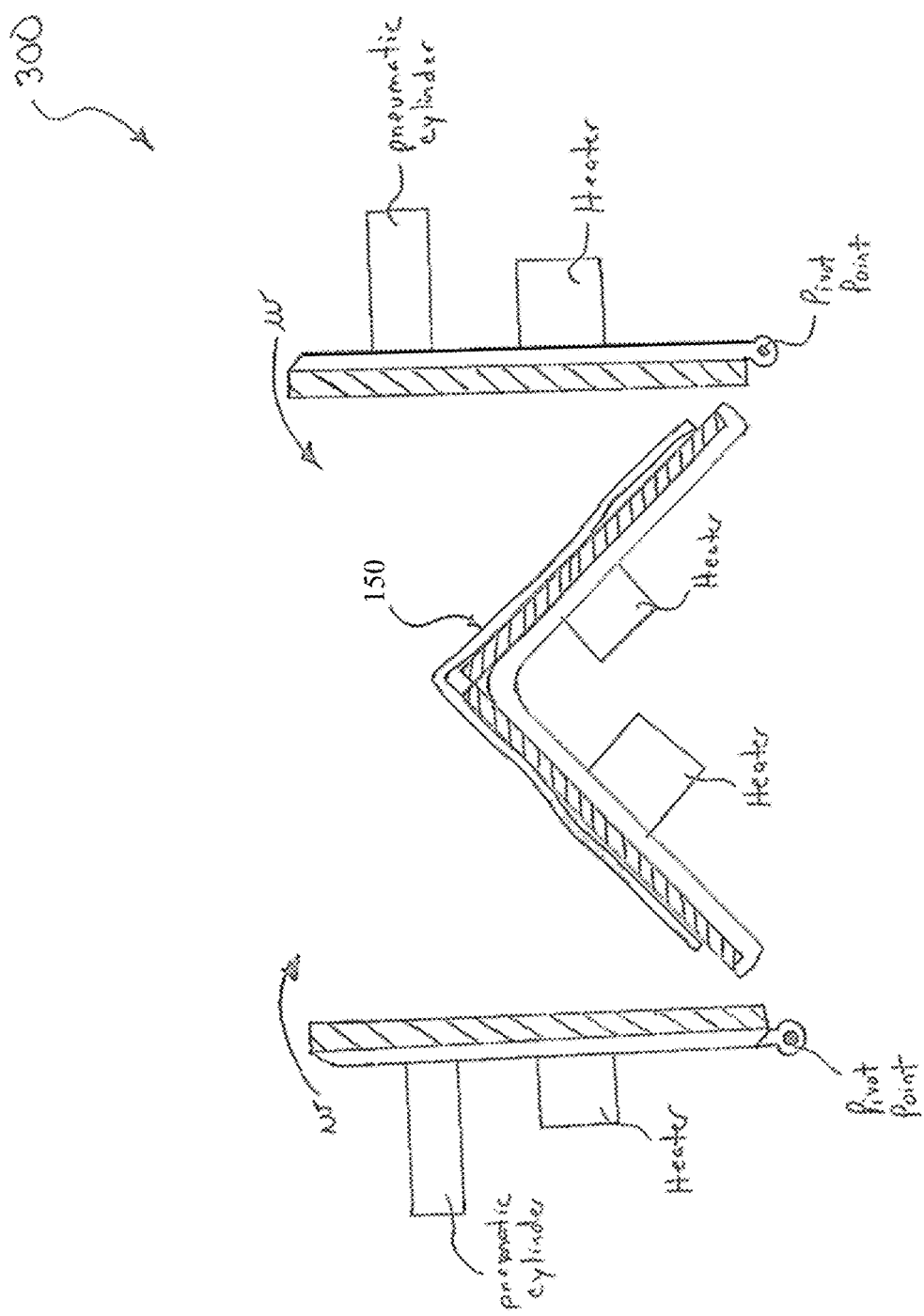
FIG. 11 is a schematic of a thermal straightening press used to flatten and straighten the walls of the chevron-shaped sleeve portion according to one embodiment of the present invention.

The last step in the process is a thermal flattening operation performed on the thermal press 300 illustrated in FIG. 11. The thermal flattening operation coins the chevron profile of the panel 150 to meet a 90°+/−2° apex angle and flatten the longitudinal walls to meet the customer flatness and twist specification. This thermal flattening/coin operation is performed in a specially designed fixture/tool 300 which develops a minimum pressure of 20 pounds per square inch and uniform pressure distribution over the entire length of the chevron profiled panel 150.

Figure 12:
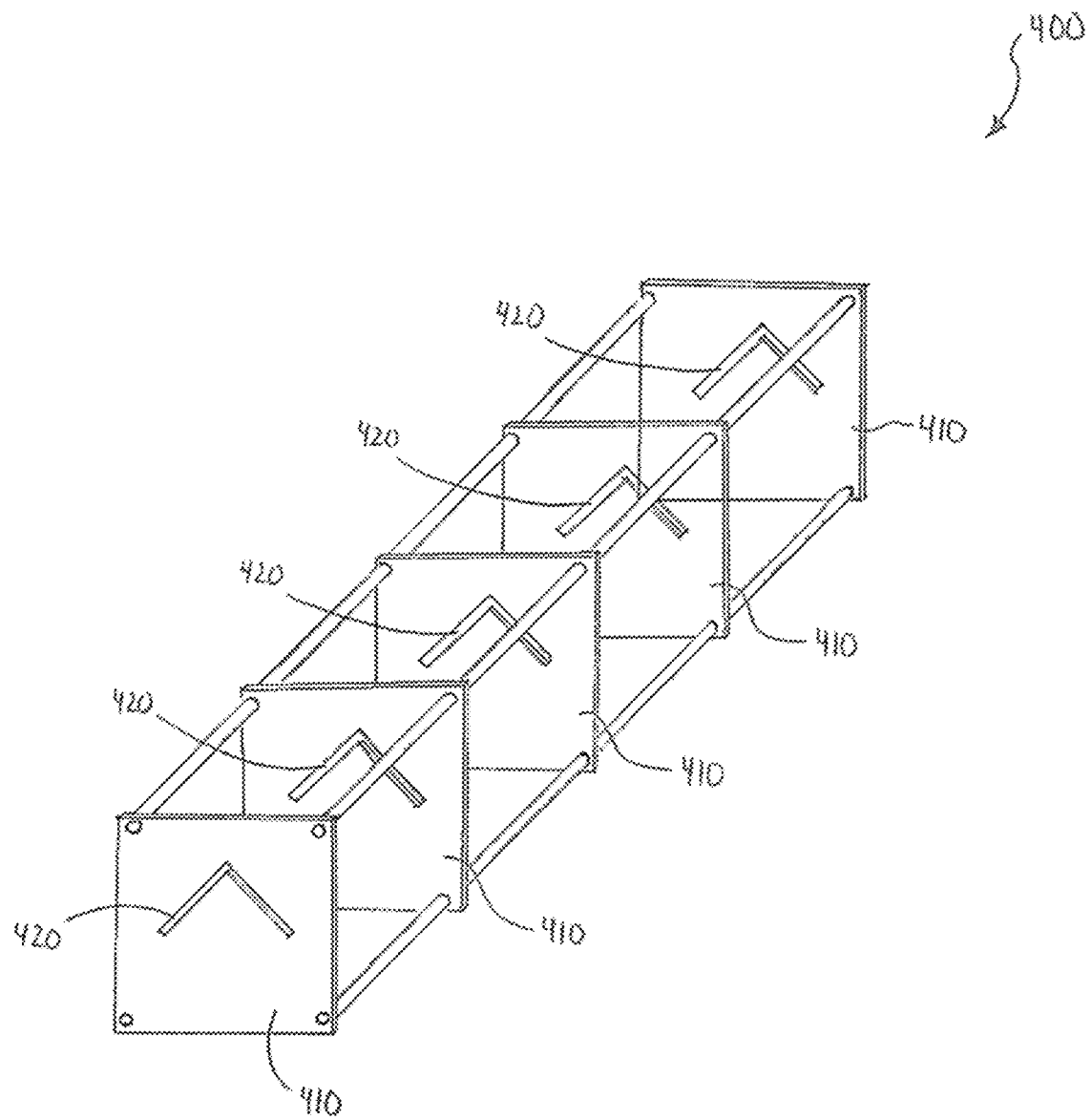
FIG. 12 is a schematic of a tool for checking the straightness of the chevron-shaped sleeve portion according to one embodiment of the present invention.

FIG. 12 illustrates a device 400 for checking the flatness and straightness of the final chevron-shaped sleeve panel 150. The device 400 has a plurality of parallel steel plates 410 having aligned slots 420 that allow the chevron-shaped sleeve panel 150 to slide therethrough if it is within specification.

It should be pointed out that part of the novelty of this technology is the flex-ability of the process to manufacture chevrons to meet PWR or BWR or any other fuel manufacturer fuel storage requirements. Chevrons have been manufactured with legs from 4.250"-8.900" width, gauge thickness for 0.065"-0.120" T, apex radii from 0.375-0.625 inches, and lengths from 130-172" L. It appears from initial fabrications that the process is very scalable and is capable of meeting all known spent fuel storage applications.

First Exemplified Alternative Embodiment & Loading Method for the Same

Referring now to FIGS. 16-23, an alternative embodiment of a neutron absorbing insert 500 (and a method of installing the same in a fuel rack) according to the present invention is disclosed. The neutron absorbing insert 500 is similar to the neutron absorbing insert 100 described above in material, specification and manufacture of the sleeve portion. Thus, only those details of the neutron absorbing insert 500 that differ from the neutron absorbing insert 100 will be described in detail below with the understanding that the discussion above is fully applicable.

Figure 16:
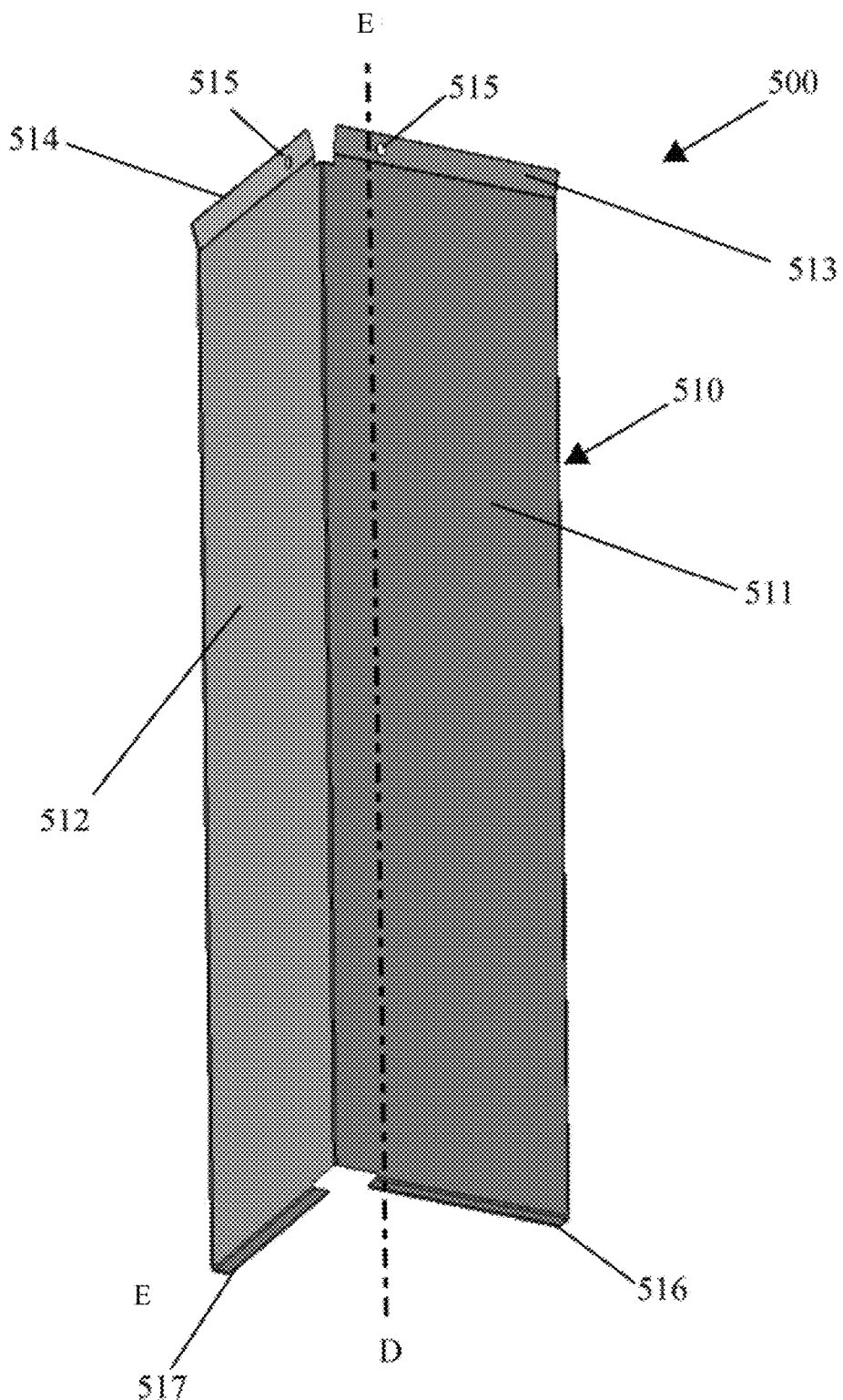
FIG. 16 is a perspective view of a neutron absorbing insert according to an alternative embodiment of the present invention.
Figure 17A:
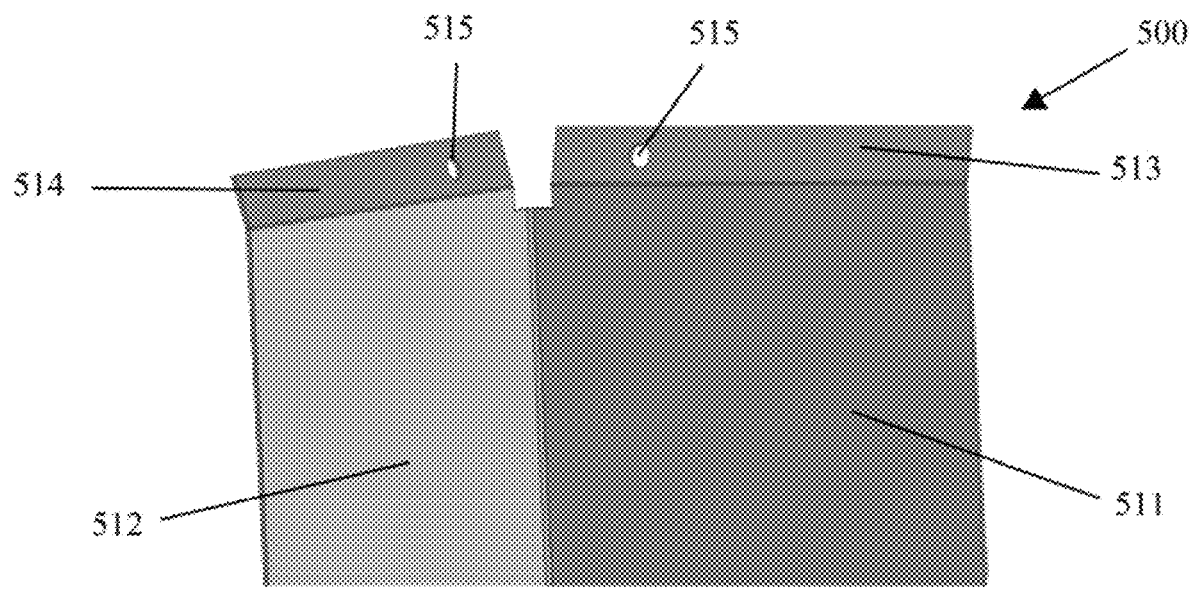
FIG. 17A is a close-up view of the top portion of the neutron absorbing insert of FIG. 16.
Figure 17B:
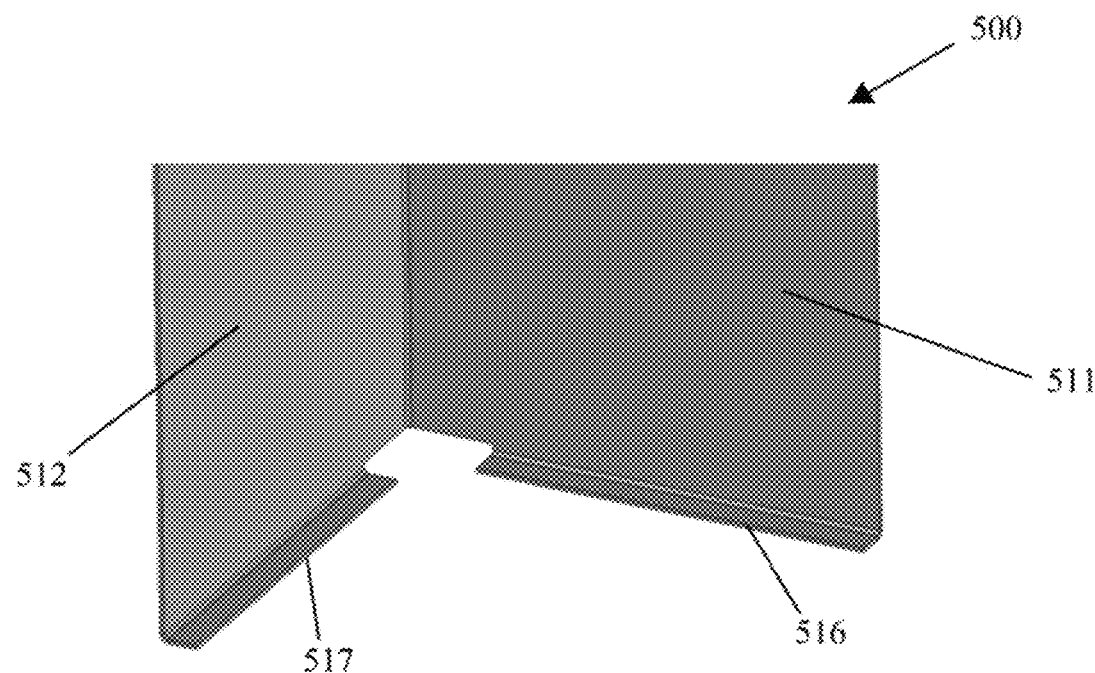
FIG. 17B is a close-up view of the bottom portion of the neutron absorbing insert of FIG. 16.

Referring first to FIGS. 16, 17A and 17B concurrently, the neutron absorbing insert 500 generally comprises a sleeve 510. Unlike the neutron absorbing insert 100, the neutron absorbing insert 500 does not have a reinforcement block or structure at the top of the sleeve 510. Instead, the tops of the walls 511, 512 of the sleeve 510 comprise flanges 513, 514 that are formed by bending the walls 511, 512

The flanges 513, 514 extend from the walls 511, 512 outwardly away from the central axis E-E of the neutron absorbing insert 500 so as to allow a fuel assembly to move freely along axis E-E without obstruction from the flanges 513, 514. This allows the fuel assembly to be loaded into and unloaded from a cell within the fuel rack that utilizes the neutron absorbing insert 500 without the need to remove the neutron absorbing insert 500 during such procedures. The flanges 513, 514 are preferably inclined upward and away from the axis E-E, thereby forming a funnel structure for guiding the fuel assembly into proper position during a loading procedure. The inclined nature of the flanges 513, 514 also minimizes the horizontal space in which the flanges 513, 514 extend, thereby minimizing the possibility of interfering with other neutron absorbing inserts 500 located in adjacent cells in the fuel rack. In other embodiments, the flanges may be bent at a 90 degree angle to the walls 511, 512 if desired. Furthermore, while the flanges 513, 514 are preferably formed by bending the top ends of the walls 511, 512, the flanges 513,514 may, of course, be omitted all together or can be connected as separate structures in other embodiments. Moreover, a reinforcement block or structure can also be utilized if desired. In such a scenario, the reinforcement structure is preferably located on the outside surface of the walls 511, 512 so as to avoid obstructing free movement of the fuel assembly along axis E-E.

Holes 515 are provided in the flanges 513, 514 so as to provide a simple mechanism by which the neutron absorbing insert 500 can be lifted and lowered within the fuel pool by a hook or other grasping tool. Of course, the holes 515 could be provided in the walls 511, 512 or can be omitted all together so long as some structure or surface arrangement is provided for facilitating movement of the neutron absorbing insert 500.

The neutron absorbing insert 500 also comprises flanges 516, 517 located at the bottom end of the sleeve 510. The flanges 516, 517 extend inwardly toward the axis D-D of the neutron absorbing insert 500. As will be discussed in grater detail below, this allows the neutron absorbing insert 500 to be adequately secured to the fuel rack at its bottom end and in a manner that does not interfere with loading and/or unloading the fuel assembly along axis E-E. The flanges 516, 517 are preferably formed at an approximate 90 degree angle to the walls 511, 512 but the invention is not so limited. Furthermore, while the flanges 513, 514 are preferably formed by bending the bottom ends of the walls 511, 512, the flanges 513, 514 may, of course, be connected as separate structures in other embodiments. The radius of curvature discussed above for the crease can be used for the bottom flanges.

Figure 18:
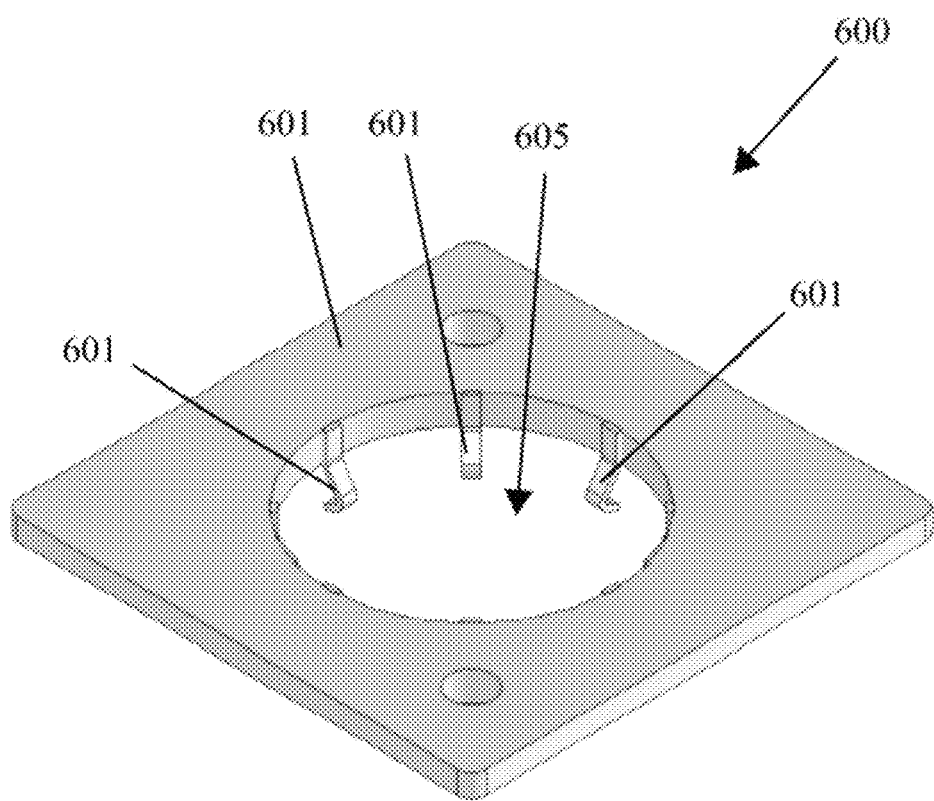
FIG. 18 is a perspective view of a hold-down plate that is used to detachably secure the neutron absorbing insert within a cell of a fuel rack.

Referring now to FIG. 18, a hold-down plate 600 is illustrated. The hold-down plate 600 comprises a plate-like body 601 formed of aluminum or other non-corrosive material. The plate 601 is of sufficient thickness to be adequately rigid so as not to deflect when performing its anchoring function discussed below. A central hole 605 is provided in the plate 601. A plurality of bendable pins or barbs 602 are attached to the plate 601 about the periphery of the central hole 605 in a circumferentially spaced apart arrangement. The barbs 601 extend beyond and protrude from the bottom surface of the plate 601. The barbs 602 are movable between an open position in which the barbs 601 can pass through a flow hole in the floor of a cell in the fuel rack and a locking position in which the barbs 601 engage the floor of a cell in the fuel rack. While the securing structure is illustrated as bendable barbs, the neutron absorbing insert 500 can be secured to the fuel rack in a variety of ways, including resilient tangs, a conical ridge that forms a tight-fit with the hole in the floor, fasteners, clamps, and/or combinations thereof. In one embodiment, rotatable cams may be used.

Figure 19A:
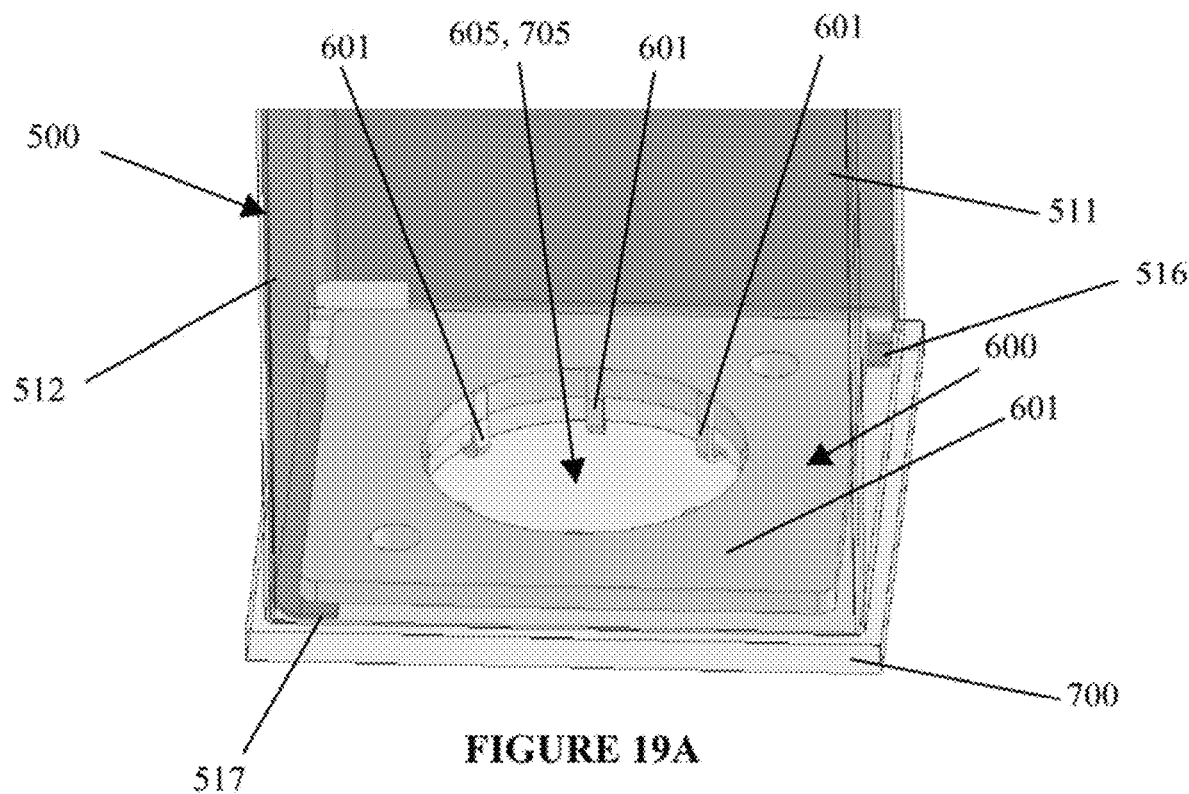
FIG. 19A is a top perspective view of neutron absorbing insert of FIG. 16 secured in place to the fuel rack by the hold-down plate of FIG. 18.
Figure 19B:
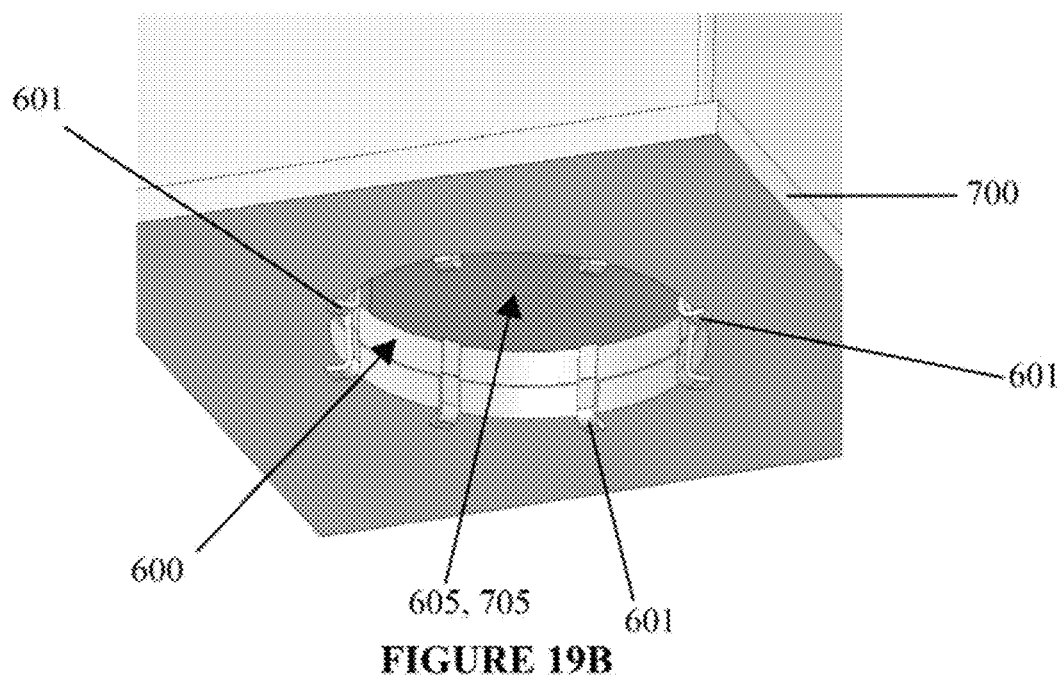
FIG. 19B is a bottom view of the fuel rack when the neutron absorbing insert of FIG. 16 is secured in place to the fuel rack by the hold-down plate of FIG. 18.

Referring to FIGS. 19A and 19B concurrently, the hold-down plate 600 is shown in its installed position wherein it is securing the neutron absorbing insert 500 in place within the cell of the fuel rack. The walls of the fuel rack are illustrated in phantom for ease of illustration. The installation of the neutron absorbing insert 500 into a cell of a fuel rack will now be discussed.

During installation of the neutron absorbing insert 500 into a cell of a fuel rack, the cell is initially empty (i.e., it does not contain a fuel assembly). In an initial step, the neutron absorbing insert 500 is coupled to a crane by using a hook that engages the holes 515 on the flanges 513, 514 of the sleeve 510. The neutron absorbing insert 500 is then aligned above the empty cell of the fuel rack and is lowered into the cell with its bottom end leading the way. The neutron absorbing insert 500 is lowered until the bottom flanges 516, 517 contact and rest atop the floor 700 of the fuel rack via a surface contact.

Once the neutron absorbing insert 500 is in place within the fuel cell, the hold-down plate 600 is then lowered/ inserted into the fuel cell with an appropriate tool. At this stage, the barbs 601 of the hold-down plate are in an open position (i.e., bent toward the axis of the central hole 605. The hold-down plate 600 continues to be lowered until it contacts the upper surfaces of the bottom flanges 516, 517 of the neutron absorbing insert 500. At this time, the barbs 601 insert into the hole 705 of the floor 700 of the fuel rack in the open position (the barbs are in the closed position in FIGS. 19A-19B). The central hole 605 of the hold-down plate 600 is substantially aligned with the hole 705 of the floor 700 of the fuel rack. This allows the cooling water within the pool to freely flow into the fuel cell as needed and in an unimpeded manner. As can be seen the, bottom flanges 516, 517 of the neutron absorbing insert 500 are located between (i.e. sandwiched) the floor 700 of the fuel rack and the hold-down plate 600 at this time.

Figure 20:
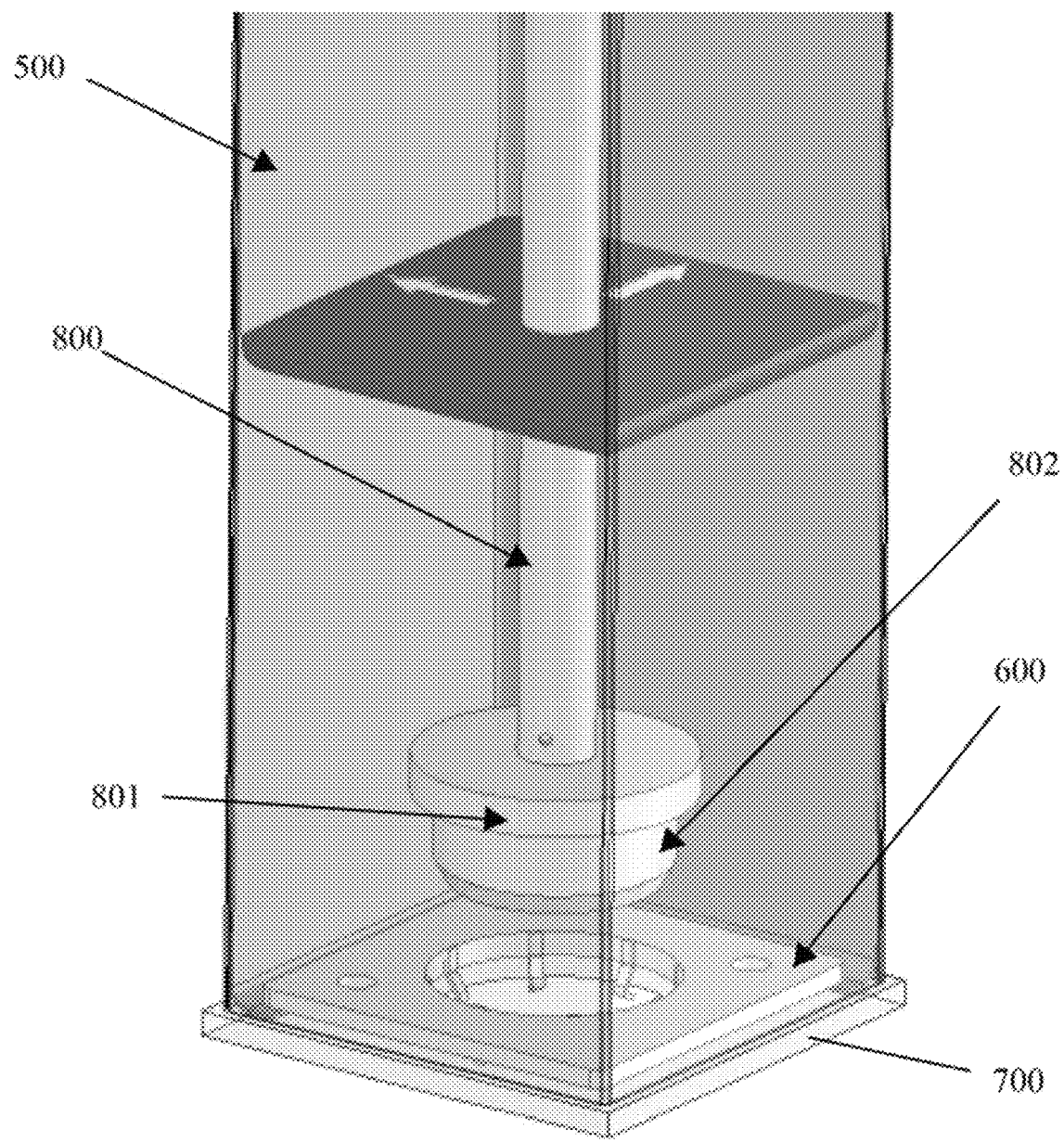
FIG. 20 is a perspective view of a plunger tool being inserted into a cell of a fuel rack to secure the hold-down plate of FIG. 18 to the fuel rack, the bottom flanges of the neutron absorbing insert being sandwiched therebetween.
Figure 21:
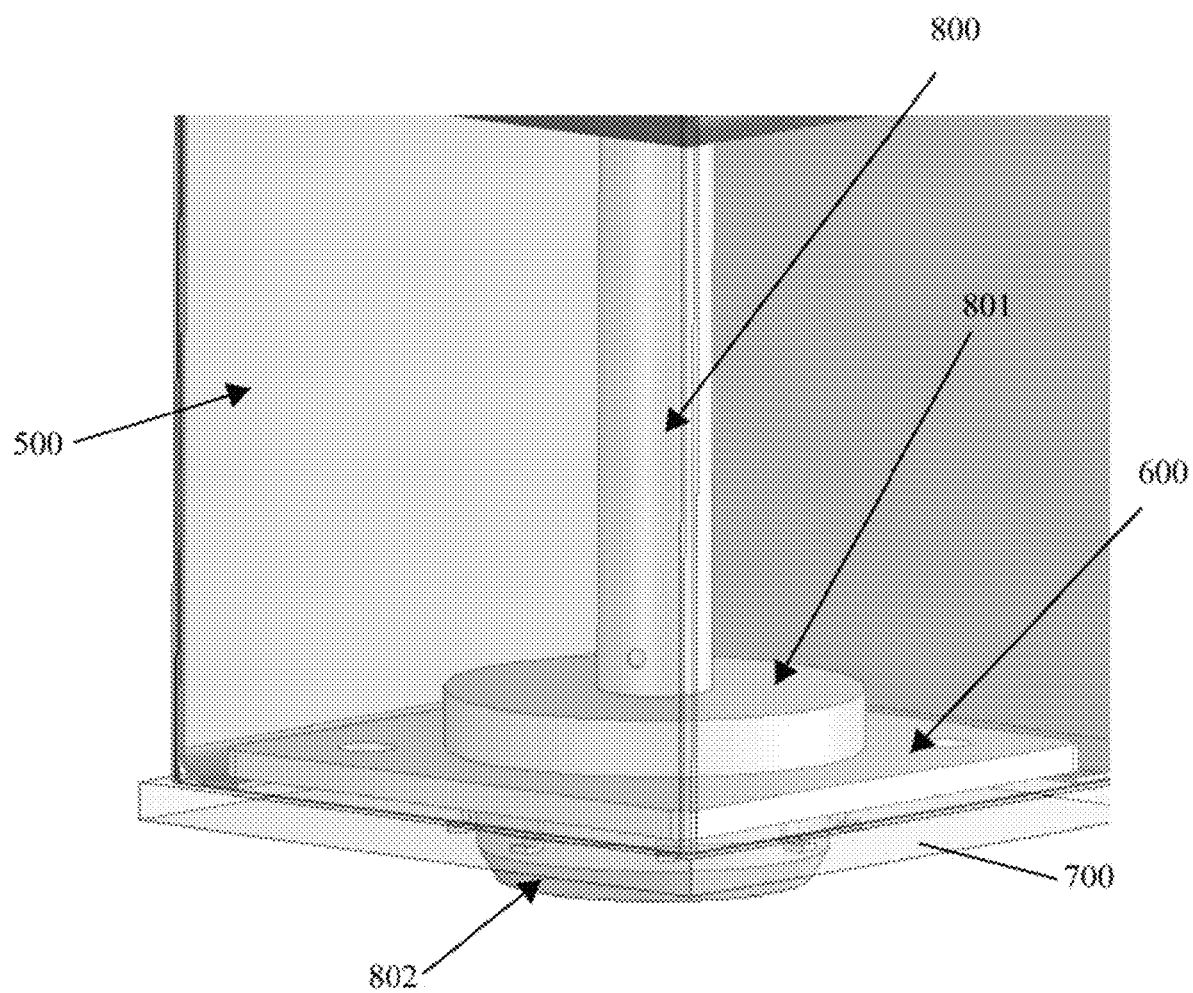
FIG. 21 a perspective view of the plunger tool fully inserted within the central hole of the hold-down plate of FIG. 18 having bent the securing pins/barbs into a locked position.
Figure 22:
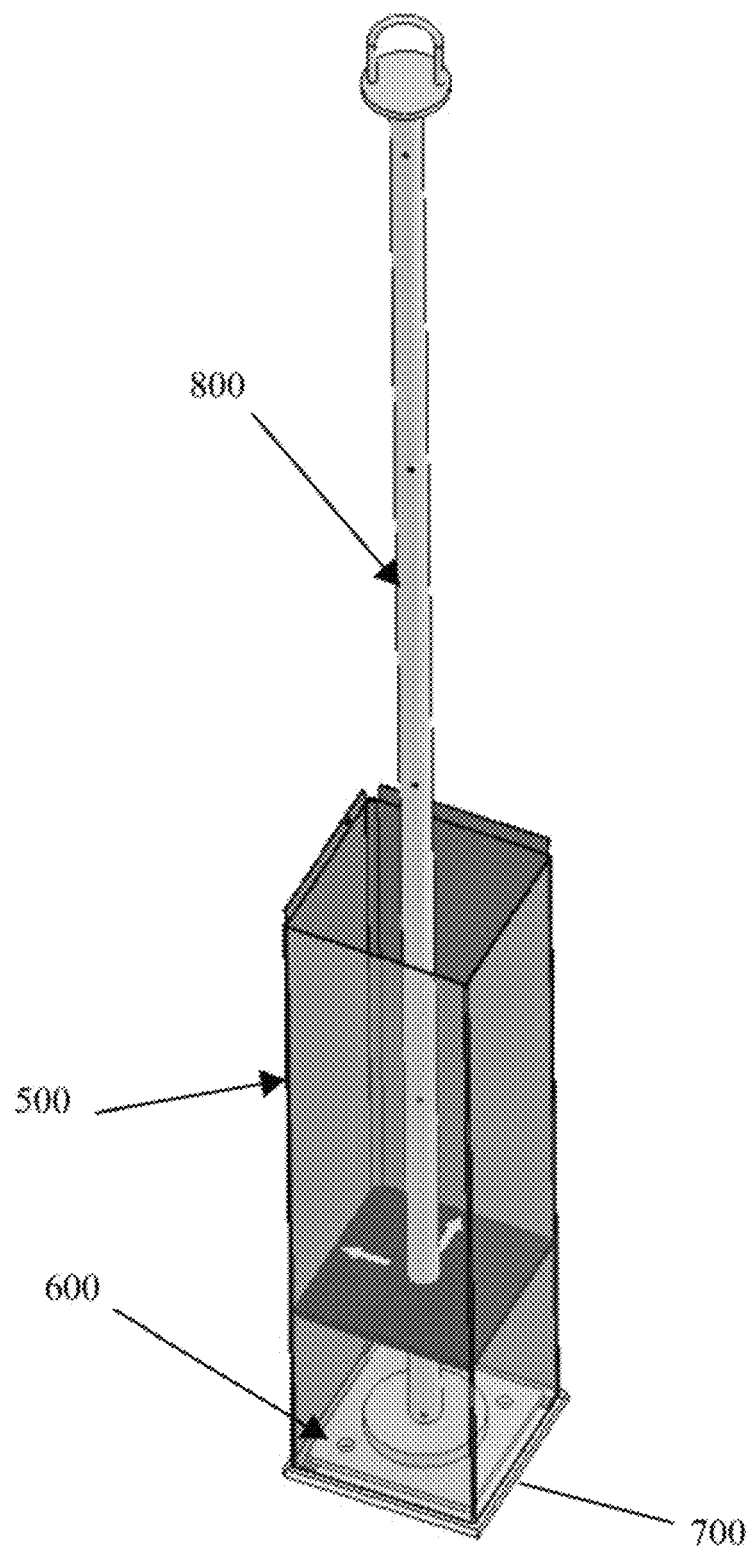
FIG. 22 is a perspective view of the entirety of the plunger tool.

Referring now to FIGS. 20-22 concurrently, once the hold-down plate 600 is in position, a plunger tool 800 is inserted into the fuel cell. A head 801 of the plunger tool 800 comprises a chamfered disc 802 that is inserted into the holed 605, 705. As the chamfered disc 802 slides through the holes 605, 705, the barbs 601 are bent outward (away from a central axis of the holes 605, 705). The barbs 601 are bent outward until their head portions slide under the floor 700 of the fuel rack and their elongated body portions contact the side walls of the holes 605, 705. As a result, the barbs 601 lock the hold-down plate 600 in place, thereby securing the neutron absorbing insert 500 in place within the fuel cell by compressing the bottom flanges 516, 517 between the floor 700 and the plate 600. Of course, other tools and locking mechanisms can be used.

Figure 23:
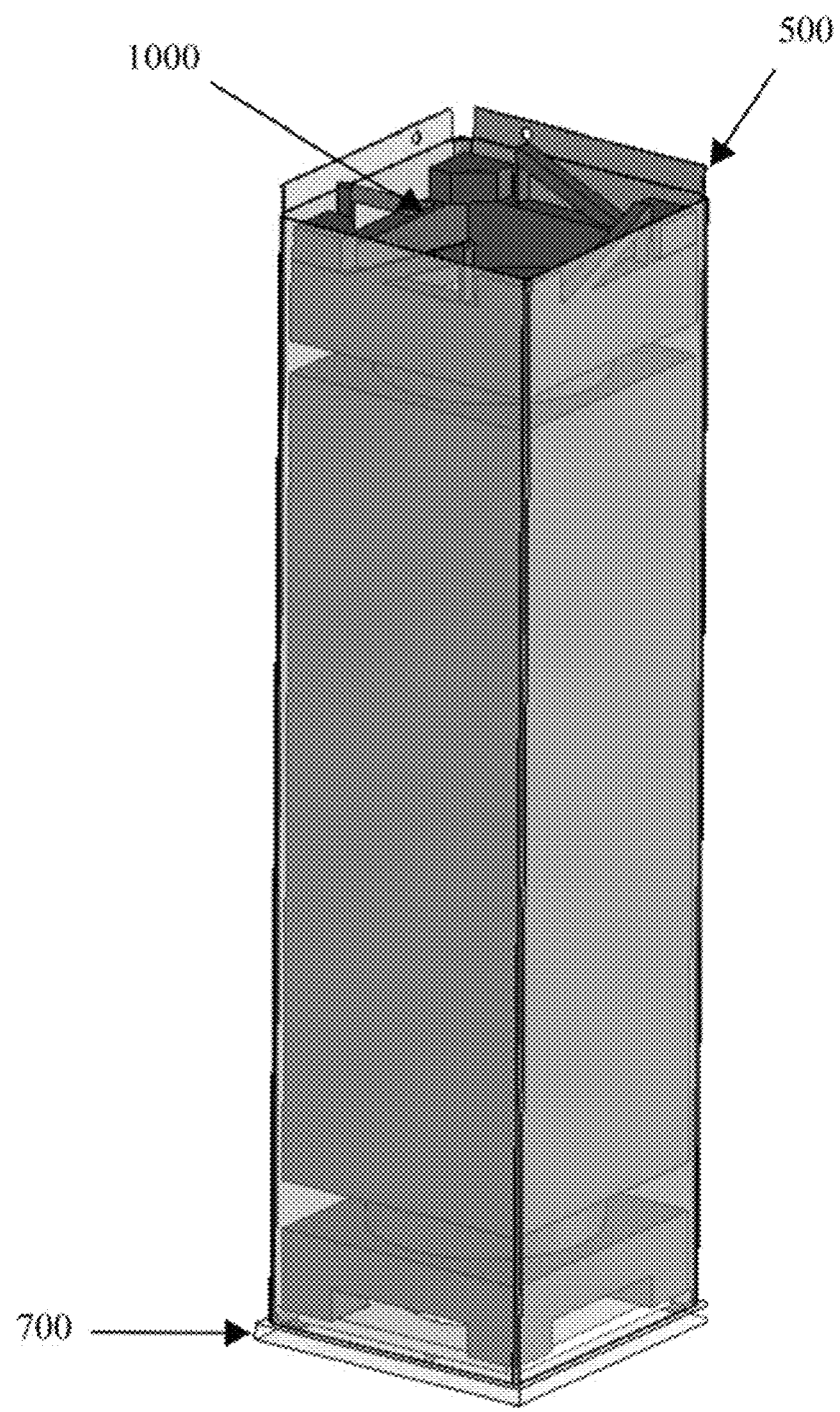
FIG. 23 is a perspective view of a fuel rack cell loaded with a fuel assembly and having the neutron absorbing insert of FIG. 16 fully installed.

Once the neutron absorbing insert 500 is secured in place, the fuel assembly 900 can be lowered safely into the fuel rack (FIG. 23).

Alternative Embodiment of Manufacturing & Neutron Absorbing Apparatus Resulting Therefrom As discussed above, in order for a neutron absorbing insert to be used in existing fuel racks, the sleeve needs to be sufficiently thin so that it can fit within the small space formed between a fuel assembly housing and the walls of the fuel cell. During further development of a commercially viable neutron absorbing insert, it was discovered that while the aforementioned manufacturing process could be used to successfully bend a single sheet of boron carbide aluminum matrix composite material into a chevron shape, the walls of the chevron shaped sleeve were experiencing undesirable degrees of waviness and/or curvature (i.e., non-planarity) within each wall. The non-planarity of the walls of the chevron shaped sleeve can present serious issues with respect to the sleeve of the neutron absorbing insert properly fitting within the small space formed between a fuel assembly housing and the walls of the fuel cell. Moreover, even if the chevron shaped sleeve could be fit into the space, non-planarity of the walls could impede the sleeve and/or fuel assembly housing from being subsequently slid in and out of the fuel rack during loading and/or unloading operations.

It has been discovered that creating a plurality of holes along the desired crease line, prior to or after bending, eliminates the non-planarity within the walls of the resulting sleeve. Surprisingly, these openings do not present a significant pathway for neutron radiation escape through the sleeve and do not appear to pose any substantial threat of criticality arising between fuel assemblies housed within adjacent cells of the fuel rack.

It is to be understood that the principles described above with respect to FIGS. 1-23 for the sleeves 110, 510 (and the manufacturing process) are applicable to this alternative embodiment of the sleeve 110B (and the associated manufacturing and fuel rack loading processes). Furthermore, this alternative embodiment of the sleeve 110B (and the associated manufacturing process) can be incorporated into the neutron absorbing insert 100, formed into the desired configuration for use in the neutron absorbing insert 500, or used with other neutron absorbing apparatus. Thus, only those significant aspects of the sleeve 110B that differ from the sleeve 110 will be discussed.

With reference to FIGS. 24A-G, the sleeve 110B and the process for manufacturing the sleeve 110B will now be described. Again, the hot manufacturing processes discussed above with respect to FIGS. 9A-9D are generally applicable to the creation of the sleeve 110B and, thus, the discussion will not duplicated with the understanding that the same basic processing steps, machines and parameters are used.

Beginning with FIG. 24A, a rough hot panel is sheared to the desired final length and width. The necessary skew is sheared into the bottom edge of the panel, resulting in the panel 150B shown at FIG. 24A. The panel 150B is a single sheet of a metal matrix composite having neutron absorbing particulate reinforcement. Preferably, the panel 150B is a single sheet of boron carbide aluminum matrix composite material. The gauge thickness of the panel 150B is preferably 0.04 to 0.10 inches, more preferably 0.06 to 0.08 inches, and most preferably 0.07 inches. In one embodiment, the panel 100B is constructed of an aluminum boron carbide metal matrix composite material that is preferably 15% to 35% by weight boron carbide, 20% to 30% by weight boron carbide, and most preferably between 24% to 25% by weight boron carbide. Of course, the invention is not so limited and other percentages may be used.

As shown in FIG. 24B, a V-shaped notch 105B is cutout of the top edge of the panel 150B and the dowel holes 103B are punched therein. Of course, the formation of the V-shaped notch 105B and/or the dowel holes 103B can be performed at a subsequent stage of the processing or can be omitted all together.

Referring now to FIGS. 24C-24D, a plurality of spaced-apart holes 160B are formed into the flat panel 150B in a linear arrangement along the intended crease line D-D. The spaced-apart holes 160B form through holes in the panel 150B, forming passageways through the panel 150B. The spaced-apart holes 160B extend the entire length of the panel 150B, from at or near the bottom edge of the panel 150B to at or near the top edge of the panel 150B. In the exemplified embodiment, the spaced-apart holes 160B are in the form of elongated slits having rounded edges. Preferably, the elongated slits 160B cover between 50% to 70% of the entire length of the crease D-D. The invention, however, is not so limited. It is nonetheless preferred that a sufficient amount of the holes 160B be provided along the crease D-D to substantially eliminate (or reduce to an acceptable tolerance of 0.25 inches) waviness in the first and second walls.

The elongated slits 160B are preferably formed by a water jet cutting tool. Of course, other cutting techniques may be used, including without limitation punching, pressing, milling, and torching. The elongated slits 160B may be formed by creating circular pierce holes at the desired distance apart and then connecting these pierce holes by forming a slit that extends between the pierce holes with the water jet cutter.

The elongated slits 160B have a major axis and a minor axis. The major axis of the elongated slits 160B are coextensive with the desired crease line D-D. The minor axis of the elongated slits 160B are substantially perpendicular to the major axis and, thus, extend perpendicular to the desired crease line D-D. While the spaced-apart holes 160B are exemplified as elongated slits, the invention is not so limited in all embodiments. In other embodiments, the spaced apart holes may be circular, rectangular, or any other shape. Moreover, alternative arrangements may be used, such as perforations, score lines, or other pre-weakening techniques.

The major axis of the elongated slits 160B have a length $L_{MAJ}$ and the minor axis of the elongated slits 160B have a length $L_{MIN}$. Comparatively, in one embodiment, the length $L_{MAJ}$ of the major axis is preferably between 50 to 100 times longer than the length $L_{MIN}$ of the minor axis, more preferably between 60 to 80 times longer than the length $L_{MIN}$ of the minor axis, and most preferably 75 times longer than the length $L_{MIN}$ of the minor axis. In one embodiment, length $L_{MAJ}$ is preferably between 4 to 8 inches, and more preferably 6 inches. In such an embodiment, the length $L_{MIN}$ preferably between 0.05 to 0.1 inches, and more preferably 0.08 inches. Of course, the invention is not limited to any specific length or ratio in all embodiments, and may be determined on case-by-case basis. Furthermore, in alternative embodiments, the lengths $L_{MAJ}$ and/or $L_{MIN}$ may vary from hole to hole.

Adjacent elongated slits 160B in the linear arrangement are separated by a distance d. The distance d is preferably shorter than the length $L_{MAJ}$ of the major axis of the elongated slits 160B. Comparatively, the distance d is preferably between 50% to 75% of the length $L_{MAJ}$ of the major axis, and more preferably 66% of the length $L_{MAJ}$ of the major axis. In one embodiment, the distance d is preferably between 2 to 6 inches, and more preferably 4 inches. Of course, the invention is not limited to any specific length or ratio in all embodiments, and may be determined on case-by-case basis. Furthermore, in alternative embodiments, the distance d may vary along the length of the crease D-D.

Referring now to FIGS. 24E-24F, once the spaced-apart holes 160B are formed, the flanges 117B, 118B are bent into the panel 150B by bending the panel 150B along line C-C.

With reference to FIGS. 24F-24G, the panel 150B is then bent along the crease line D-D, thereby forming the sleeve 110B. Bending of the panel along the crease line D-D results in the crease 113B of the resulting sleeve 110 to comprise the elongated slits 160B. The presence of the elongated slits 160B in the crease 113B allows the sheet 150B to remain in a bent arrangement without the creation of stresses that create waviness within each of the longitudinal walls 111B, 112B formed. The crease 113B connects the non-coplanar longitudinal walls 111B, 112B together. In the illustrated embodiment, the non-coplanar longitudinal walls 111B, 112B are in a chevron shape. It should be noted that the bending of the panel 150B may result in the elongated slits 160B becoming visibly minimized and/or eliminated from the final sleeve 110B.

Preferably, the resulting sleeve 110B has an inner radius of curvature along the crease 113B from 0.15 to 0.25 inches, and more preferably 0.22 inches. Of course, the invention is not so limited.

Finally, while the invention is described wherein the formation of the elongated slits 160B in the panel 150B takes place prior to the panel 150B being bent, it is possible for the elongated slits 160B to be formed into the panel 150B at a subsequent or preceding step in the process. Furthermore, in some embodiments, the elongated slits 160B may be formed into the crease 113B of the sleeve 110B after the panel 150B has been bent into the chevron-shape to eliminate built-up stresses. In this manner, pre-existing neutron absorbing inserts, such as neutron absorbing insert 100A, can be processed to eliminate undesired non-planarity in the walls.

The present invention has been described in relation to the accompanying drawings; however, it should be understood that other and further modifications, apart from those shown or suggested herein, may be made within the spirit and scope of the present invention. It is also intended that all matter contained in the foregoing description or shown in the accompanying drawings shall be interpreted as illustrative rather than limiting.

What is claimed is:

1. A neutron absorbing apparatus comprising:
   a plate structure having a first wall and a second wall that is non-coplanar to the first wall;
   the first and second walls being formed by a single panel of a metal matrix composite having neutron absorbing particulate reinforcement which is bent into the non-coplanar arrangement along a crease; and
   a plurality of spaced-apart elongated slits formed into the single panel along the crease which are configured and arranged to facilitate bending the single panel into the non-coplanar arrangement;
   wherein the elongated slits cover between 50% to 70% of an entire length of the crease;
   wherein the slits are not formed as a result of a weldment of plural panels.

2. The neutron absorbing apparatus of claim 1, wherein the slits each define a major axis and a minor axis, the major axis of the slits coextensive with the crease and the minor axis being perpendicular to the major axis.

3. The neutron absorbing apparatus of claim 2, wherein adjacent slits are separated by a distance that is shorter than the major axis.

4. The neutron absorbing apparatus of claim 3, wherein the distance is between 50% to 75% of the major axis.

5. The neutron absorbing apparatus of claim 1, wherein the first and second walls are substantially planar and angled to form a chevron shape.

6. The neutron absorbing apparatus of claim 1, wherein the plate structure is a chevron shape.

7. The neutron absorbing apparatus of claim 6 further comprising:
   a reinforcement bar connected to a top end of the plate structure;
   wherein the metal matrix composite having neutron absorbing particulate reinforcement is at least 20% by volume neutron absorbing particulate;
   wherein the metal matrix composite having neutron absorbing particulate reinforcement is a boron carbide aluminum matrix composite material, a boron carbide steel matrix composite material, a carborundum aluminum matrix composite material or a carborundum steel matrix composite material; and
   wherein the crease has a gauge thickness between 0.05 to 0.09 inches.

8. A neutron absorbing apparatus insert comprising:
   a plate structure having a first wall and a second wall that is non-coplanar to the first wall;
   the first and second walls being formed by a single panel of a metal matrix composite having neutron absorbing particulate reinforcement which is bent into the non-coplanar arrangement along a crease; and
   a plurality of spaced-apart elongated slits formed into the single panel along the crease to facilitate bending the single panel into the non-coplanar arrangement;
   wherein the plate structure is configured for insertion into cells of a fuel storage rack;
   wherein the slits are not formed as a result of a weldment of plural panels.

9. The neutron absorbing apparatus of claim 8, wherein the plate structure is a chevron shape.

10. The neutron absorbing apparatus of claim 9, wherein the elongated slits cover between 50% to 70% of an entire length of the crease.

* * * * *